(12) United States Patent
Liskov et al.

(10) Patent No.: US 6,925,504 B1
(45) Date of Patent: Aug. 2, 2005

(54) METHODS AND APPARATUS FOR OBTAINING CONTENT FROM A CONTENT-ORIGINATING DEVICE WITHIN A COMPUTERIZED NETWORK

(75) Inventors: Barbara Liskov, Waltham, MA (US); John F. Carr, Newton, MA (US)

(73) Assignee: Cisco Technology, Inc., San Jose, CA (US)

( * ) Notice: Subject to any disclaimer, the term of this patent is extended or adjusted under 35 U.S.C. 154(b) by 457 days.

(21) Appl. No.: 10/066,247

(22) Filed: Jan. 31, 2002

(51) Int. Cl.[7] .................................................. G06F 13/368
(52) U.S. Cl. ...................... 709/239; 709/245; 709/252; 709/217; 709/218; 709/219; 709/203; 709/200; 370/356; 370/351
(58) Field of Search ............................... 370/351, 356, 370/367, 392, 395.52, 400, 431; 709/200, 201, 203, 217, 218, 219, 239, 245, 252

(56) References Cited

U.S. PATENT DOCUMENTS

| | | | | |
|---|---|---|---|---|
| 5,056,085 A | * | 10/1991 | Vu | 370/400 |
| 5,684,961 A | * | 11/1997 | Cidon et al. | 709/243 |
| 6,006,264 A | | 12/1999 | Colby et al. | 709/226 |
| 6,078,590 A | * | 6/2000 | Farinacci et al. | 370/432 |
| 6,111,941 A | * | 8/2000 | Schreyer | 379/220.01 |
| 6,163,807 A | * | 12/2000 | Hodgkinson et al. | 709/229 |
| 6,205,481 B1 | | 3/2001 | Heddaya et al. | 709/226 |
| 6,331,983 B1 | | 12/2001 | Haggerty et al. | 370/400 |

OTHER PUBLICATIONS

White, Ron. How Computers Work. 1997, Ziff–Davis Press, Macmillan Computer Publishing USA, pp. 234–235.*

* cited by examiner

Primary Examiner—B. James Peikari
(74) Attorney, Agent, or Firm—David E. Huang, Esq.

(57) ABSTRACT

A technique can be used to obtain content (e.g., a live feed, pre-positioned content, etc.) from a content-originating device (a content source). The technique involves identifying a tree-based location-path having a series of locations which leads from the computerized device to the content-originating device. Each location includes a set of devices, and the set of devices of at least one location includes multiple devices. The technique further involves selecting a device-path from the computerized device to the content-originating device based on the identified location-path, and acquiring the content from the content-originating device from at least one of the devices along the selected device-path. The selected device-path includes at least one device of each location of the series of locations.

24 Claims, 25 Drawing Sheets

| HOST DOMAIN | AUTHORIZED CONTENT SERVERS | TREE |
|---|---|---|
| WWW.HD-1.COM | CONTENT SERVERS 52-A2, 52-A5, 52-B3, 52-B4, 52-C1, 52-C2, 52-D3, 52-D4, 52-E1, 52-E3, 52-F2, 52-F3, 52-G1, 52-G3 | 23 |
| WWW.HD-2.COM | CONTENT SERVERS 52-A1, 52-A4, 52-B1, 52-C3, 52-D1, 52-D2, 52-E2, 52-E5, 52-F1, 52-G2 | 23 |
| WWW.HD-3.COM | CONTENT SERVERS 52-A3, 52-B2, 52-B3, 52-F1, 52-F2, 52-F3, 52-C1, 52-E3, 52-E5 | 17 |

```
CONFIGURATION DATA 152

TREE FORMING LEADER 156 = (YES/NO)

CONTENT FETCHING LEADER 158 = (YES/NO)

PROBING LEADER 160 = (YES/NO)

AUTHORIZED HOST DOMAINS 161

LOCATION DATA 154

LOCATION IDENTIFIER 162 = (LOCATION ID)

DEVICE IDENTIFIER 164 = (DEVICE ID)

CONSTRAINTS 166 = (E.G., LEAF ONLY,
                       ANCESTOR OF
                       DEVICE X ONLY,
                       ETC.)
                    •
                    •
                    •
```

170

---

CONFIGURATION DATA 152

TREE FORMING LEADER 156 = "YES"

CONTENT FETCHING LEADER 158 = "NO"

PROBING LEADER 160 = "YES"

AUTHORIZED HOST DOMAINS 161 = NONE

LOCATION DATA 154

LOCATION IDENTIFIER 162 = "ID FOR LOCATION 60-E"

DEVICE IDENTIFIER 164 = "ID FOR DEVICE 52-E5"

•
    •
    •

190

```
CONFIGURATION DATA 152

TREE FORMING LEADER 156 = "NO"

CONTENT FETCHING LEADER 158 = "NO"

PROBING LEADER 160 = "NO"

AUTHORIZED HOST DOMAINS 161 = "www.hd-1.com"

LOCATION DATA 154

LOCATION IDENTIFIER 162 = "ID FOR LOCATION E"

DEVICE IDENTIFIER 164 = "ID FOR DEVICE 40-E1"

•
            •
            •
```

210

```
CONFIGURATION DATA 152

TREE FORMING LEADER 156 = "NO"

CONTENT FETCHING LEADER 158 = "YES - www.hd-1.com"

PROBING LEADER 160 = "NO"

AUTHORIZED HOST DOMAINS = "www.hd-1.com"

LOCATION DATA 154

LOCATION IDENTIFIER 162 = "ID FOR LOCATION E"

DEVICE IDENTIFIER 164 = "ID FOR DEVICE 40-E3"

| AUTHORIZED HOST DOMAINS | AUTHORIZED SERVERS AT CURRENT LOCATION IN DEVICE PRIORITY | TREE |
|---|---|---|
| WWW.HD-1.COM | CONTENT SERVER 52-E3, CONTENT SERVER 52-E1, CONTENT SERVER 52-E4 | 23 |
| WWW.HD-2.COM | CONTENT SERVER 52-E2, CONTENT SERVER 52-E5 | 23 |
| WWW.HD-3.COM | CONTENT SERVER 52-E3, CONTENT SERVER 52-E5 | 17 |
| ... | ... | ... |

FIG. 19

| AUTHORIZED HOST DOMAINS | AUTHORIZED SERVERS AT ALL LOCATIONS IN DEVICE PRIORITY | TREE |
|---|---|---|
| WWW.HD-1.COM | CONTENT SERVER 52-E3, CONTENT SERVER 52-E1, CONTENT SERVER 52-E4 | 23 |
| WWW.HD-2.COM | CONTENT SERVER 52-E2, CONTENT SERVER 52-E5 | 23 |
| WWW.HD-2.COM | CONTENT SERVER 52-C3 | 23 |
| WWW.HD-1.COM | CONTENT SERVER 52-C1, CONTENT SERVER 52-C2 | 23 |
| . | . | . |

FIG. 20

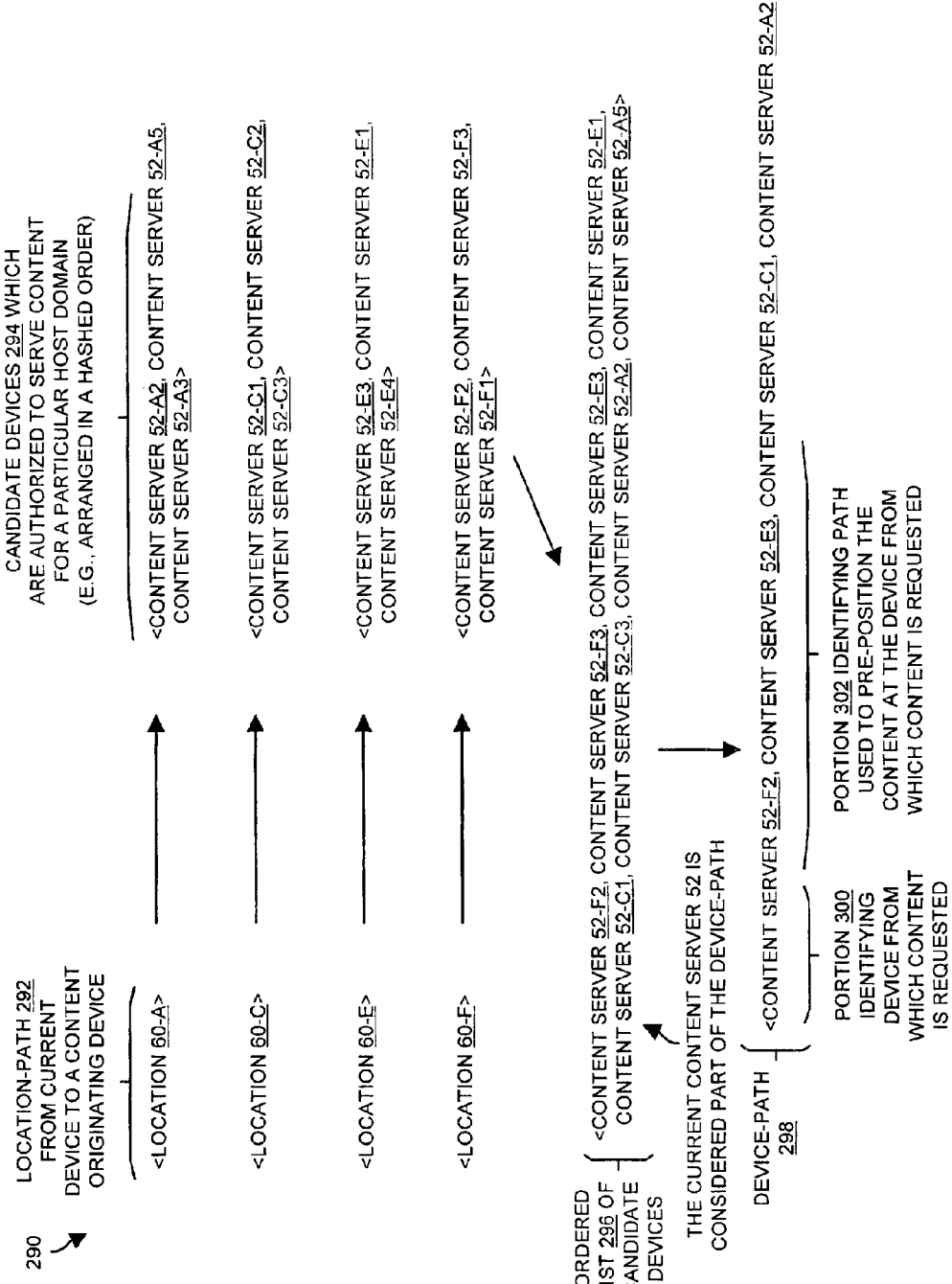

METHODS AND APPARATUS FOR OBTAINING CONTENT FROM A CONTENT-ORIGINATING DEVICE WITHIN A COMPUTERIZED NETWORK

BACKGROUND OF THE INVENTION

A typical content distribution network (CDN) includes multiple content servers which are distributed throughout a network (e.g., the Internet). A content source (e.g., a home site for a host domain) distributes content to the content servers in an attempt to (i) lower the load on the content source, and (ii) position the content closer to users of the content (e.g., Internet browsers which connect through Internet Service Providers). Accordingly, the users will tend to experience smoother delivery of the content and faster response times particularly when the content is large (e.g., a live video feed, a game, a very large file, etc.).

FIG. 1 shows an exemplary conventional CDN 20. The conventional CDN 20 includes multiple content servers 22-1, . . . , 22-27 (collectively, content servers 22), and connecting media 24 that connects the content servers 22 together. The connecting media 24 includes data communications devices 26 (e.g., switches, routers, bridges, hubs, etc.) and transmission media 28 (e.g., copper wire, fiber optic cable, etc.). The CDN 20 further includes a content distribution manager (CDM) 30, a content-originating device 32 (i.e., a content source), and content requesting devices 34-1, 34-2 (collectively, content requesting devices 34). The CDM 30 configures the content servers 22 to obtain content from the content-originating device 32 and to serve that content in response to requests for that content. Further details of how the CDM 30 configures the content servers 22 will now be described with reference to FIGS. 2 and 3.

Suppose that a content distribution company (i) owns and operates the CDM 30 and the content servers 22, and (ii) is in the business of controlling the content servers 22 so that the content servers 22 distribute content on behalf of the company's customers. To this end, the company may configure a subset of the content servers 22 to distribute content for a particular customer (e.g., the owner and operator of the content-originating device 32). FIG. 2 shows a subset 36 of content servers 22 for distributing content for the particular customer (the content servers 22 belonging to the subset 36 are in bold). As shown, the subset 36 of content servers 22 includes content servers 22-3, 22-4, 22-6, 22-9, 22-12, 22-13, 22-14, 22-15, 22-18, 22-19, 22-20, 22-22, 22-23 and 22-25.

To configure the subset 36 of content servers 22 to distribute content on behalf of the particular customer, a CDN administrator enters data describing the subset 36 into the CDM 30. The CDN administrator then directs the CDM 30 to communicate with the content servers 22 through the connecting media 24 to appropriately configure the content servers 22 (e.g., directs particular content servers 22 to obtain and serve content on behalf of the customer, and directs other content servers 22 not to obtain and serve content on behalf of the customer). In response, the content servers 22 communicate with each other to form hierarchical relationships which dictate how the content will flow from the content-originating device 32 to the content servers 22 which are configured to obtain and serve the content.

FIG. 3 shows, by way of example only, a distribution tree 40 representing the hierarchical relationships established between the content servers 22 of the subset 36. The distribution tree 40 has an inverted tree shape and pictorially illustrates how the subset 36 of content servers 22 carries content from the content-originating device 32, e.g., for access by the content requesting devices 34-1, 34-32 (also see FIG. 2). The tree 40 includes a single root node 42 and multiple non-root nodes 44. The root node 42 represents the content server 22-6 which is the first content server 22 to receive content from the content-originating device 32 and the only content server 22 to receive content directly from the content-originating device 32. The content servers 22-3, 22-4, 22-9 and 22-14 (represented by non-root nodes 44) are considered to be children of the content server 22-6 and obtain and serve the content from the content server 22-6. The content server 22-6 is considered to be the parent of the content servers 22-3, 22-4, 22-9 and 22-14. Content continues to flow further into the CDN 20 after it reaches the content servers 22-3, 22-4, 22-9 and 22-14. As shown in FIG. 3, the content flows from the content server 22-14 to the content servers 22-12, 22-13, 22-15, 22-23, and 22-25, and so on.

With reference back to FIG. 2, the CDN components which carry the content in accordance with the tree 40 of FIG. 3 are shown in bold in order to illustrate the flow of content through the CDN 20. As shown in FIG. 2, the requesting devices 34-1, 34-2 obtain the content directly from the content servers 22-18 and 22-19 both of which acquired the content directly from the content server 22-25. That is, the content server 22-18 obtained the content directly from the content server 22-25, and the content server 19 similarly obtained the content directly from the content server 22-25.

As just described above, the content server 22-25 obtained the content indirectly from the content-originating device 32 through the content servers 22-6 and 22-14. Accordingly, the load on the content-originating device 32 is lowered (i.e., the content-originating device does not have the burden of providing the content directly to the requesting devices 34-1, 34-2), and the response times from the perspectives of the requesting devices 34-1, 34-2 are faster (i.e., there is less network traffic/congestion and shorter distances to between the requesting devices 34-1, 34-2 and the content servers 22-18, 22-19 than between the requesting devices 34-1, 3-42 and the content originating-device 32).

It should be understood that the content servers 22 continuously communicate with each other (e.g., every few seconds) through the connecting media 24 in order to (i) maintain the hierarchical relationships existing between the content servers 22 (see the tree 40 of FIG. 3) and perhaps (ii) adjust these hierarchical relationships in response to changing network conditions, e.g., in response to particular content servers 22 becoming unavailable due to failure or becoming difficult to communicate with due to network traffic/congestion, in response to particular content servers 22 becoming overburdened, etc.

For example, suppose that the content server 22-25 fails due to a hardware problem (see FIGS. 2 and 3). Due to the constant communications among the content servers 22, the content servers 22-18, 22-19, 22-20 and 22-22, which previously had obtained content from the content server 22-25, can quickly detect the unavailability of the content server 22-25. In response to such detection, the content servers 22-18, 22-19, 22-20 and 22-22 can quickly form parent/child relationships with other content servers 22 (e.g., the content server 22-23) to maintain service (e.g., to continue to provide obtain and serve content to the requesting devices 34-1, 34-2). That is, the remaining content servers 22 can communicate with each other and adjust the formation of the tree 40. Accordingly, the CDN 20 includes a fault tolerance feature that enables the CDN 20 to sustain service to requesting devices 34 even in the event of an undesired event (e.g., failure of a content server 22, network traffic, etc.).

SUMMARY OF THE INVENTION

Unfortunately, there are deficiencies to the above-described conventional CDN 20. For example, in order to provide fault tolerance, the content servers 22 of the conventional CDN 20 continuously communicate with each other to maintain and perhaps adjust their hierarchical relationships. Such communications take processing time away from the content servers 20 thus limiting their performance (i.e., throughput, capacity, etc.).

Additionally, the above-described CDN 20 does not scale very well due to the constant communications required to maintain and perhaps adjust their hierarchical relationships (e.g., communications every few seconds). That is, as the number of content servers 22 in the CDN increases, the content servers 22 become increasingly burdened with overhead required to maintain and manage the hierarchical relationships. Moreover, the connecting media 24 (i.e., the data communications devices 26 and the transmission media 28) tend to become significantly more congested with communications between the content servers 22 attempting to form and perhaps adjust the hierarchical relationships. Such network traffic can prevent the content servers 22 from distributing content (e.g., a live video feed) to parts of the CDN 20 in a timely manner (see the requesting devices 34-1 34-2 of FIGS. 1 and 2).

Furthermore, when the above-described CDN 20 forms a tree 40 (see FIG. 3), the tree 40 includes a content server 22 for each node 42, 44. Accordingly, similar trees 40 which differ in only one or two content servers 22 will have different trees 40. As a result, the CDN 20 may require the use of many different trees 40 just because the tree topologies differ by one or two content servers 22 (i.e., a change in a single content server 22 results in a completely new tree 40). The storage and maintenance of such different trees 40 can require a significant amount of resources (e.g., memory, processor time, etc.) thus further limiting the capacity and throughput of the CDN 20.

Embodiments of the invention are directed to techniques for obtaining content from a content-originating device (e.g., a home site for a host domain) using a virtual content-distribution tree in which each node refers to a set or group of devices (one or more content servers) rather than an individual device (i.e., a single content server). As will be further explained below, the use of such "virtual trees" can greatly reduce tree size and the number of trees thus leading to a reduction in overhead, and the resulting network traffic, for tree maintenance and management.

One embodiment of the invention is directed to a technique for obtaining content (e.g., a live feed, pre-positioned content, etc.) from a content-originating device (a content source). The technique involves identifying a tree-based location-path having a series of locations which leads from the computerized device to the content-originating device. Each location includes a set of devices with the set of devices of at least one location including multiple devices. The technique further involves selecting a device-path from the computerized device to the content-originating device based on the identified location-path, and acquiring the content from the content-originating device from at least one of the devices along the selected device-path. The selected device-path includes at least one device of each location of the series of locations. The use of locations (of sets of devices) as nodes of a distribution tree rather than individual content servers enables a reduction in the size and number of trees thus enabling a reduction in tree maintenance overhead. Furthermore, fault tolerance can be achieved through selection of the device-path thus alleviating the need for continuous communications between devices. Accordingly, the devices can dedicate more resources (e.g., memory, processor time, etc.) to serving content, and network traffic is reduced.

The features of the invention, as described above, may be employed in content distribution systems, devices and methods as well as other computer-related components such as those of Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 11 is a table of host domain assignments for the content distribution system of FIG. 4.

FIG. 17 is a set of configuration parameters which is suitable for use by the computerized device of FIG. 10 when configured to operate as a content fetching leader.

FIG. 19 is a table of host domain assignments which can be used by a computerized device when determining a device-path.

FIG. 20 is another table of host domain assignments which can be used by another computerized device when determining a device-path.

FIG. 25 is an information flow diagram showing, by way of example, formation of an ordered list of candidate devices when determining a device-path in accordance with the second approach.

DETAILED DESCRIPTION

General Description

Embodiments of the invention are directed to techniques for obtaining content from a content-originating device (e.g., a home site for a host domain) using a virtual content-distribution tree in which the nodes of the tree refer to sets or groups of devices i.e., one or more content servers) rather than individual devices (i.e., individual content servers). As will be further explained below, the use of such "virtual trees" can greatly reduce tree size and the number of trees thus leading to a reduction in overhead, as well as the resulting network traffic, for tree maintenance and management.

Figure 4:
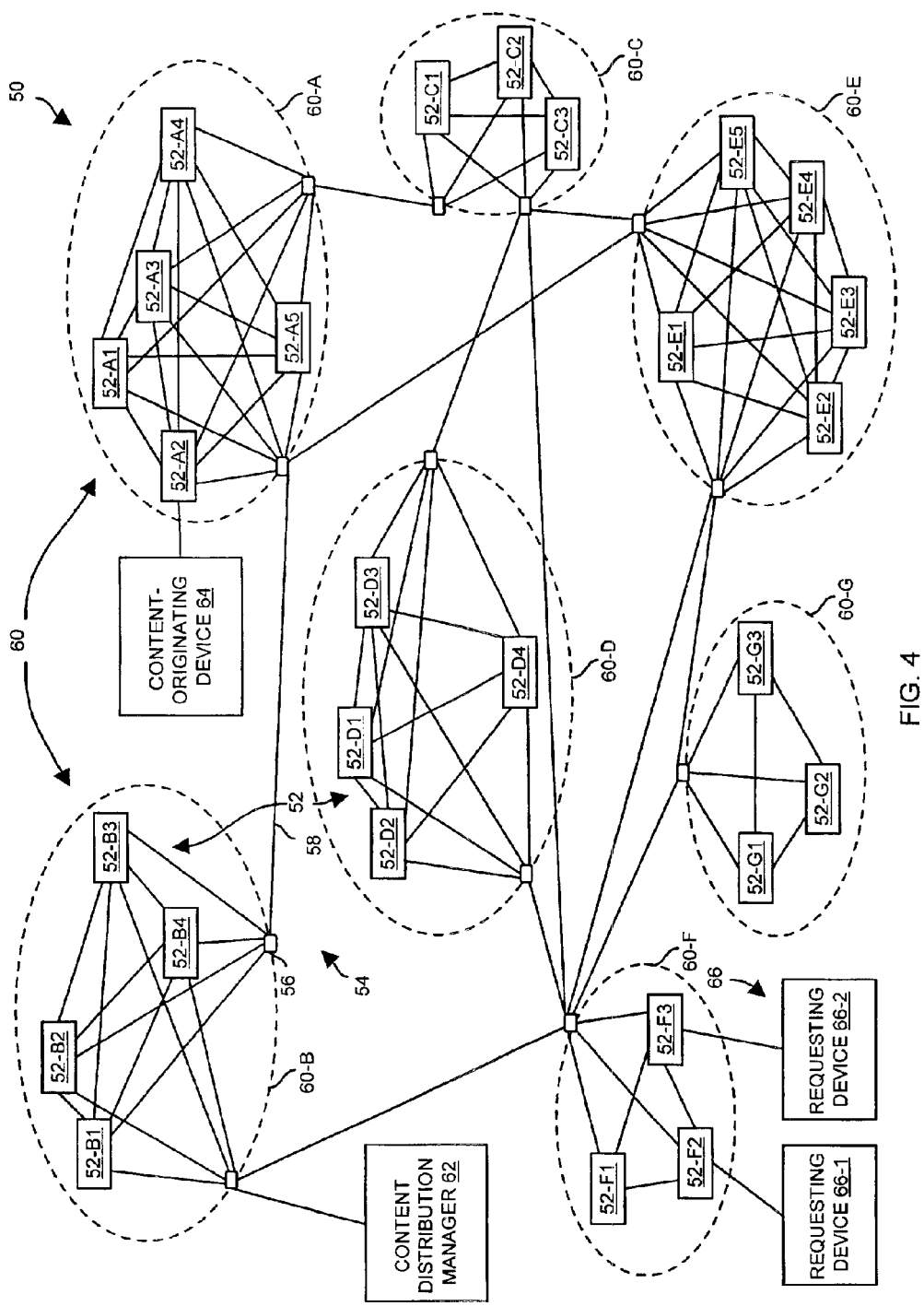
FIG. 4 is a block diagram of a content distribution system which is suitable for use by the invention.

FIG. 4 shows a content distribution system 50 which is suitable for use by the invention. The content distribution system 50 operates as a content distribution network (CDN). The content distribution system 50 includes multiple content servers 52, and connecting media 54 that enables the content servers 52 to communicate with each other. The connecting media 54 includes data communications devices 56 (e.g., switches, routers, bridges, hubs, etc.) and transmission media 58 (e.g., copper wire, fiber optic cable, etc.).

The content servers 52 reside at particular locations 60. For example, a set of content servers 52-A1, . . . , 52-A5 resides at a location 60-A, a set of content servers 52-B1, . . . , 52-B4 resides at a location 60-B, and so on (see dashed lines in FIG. 4). As will be explained later, the criteria which determines whether a particular content server 52 resides in one location 60 or another location 60 is flexible, e.g., can be based on the proximity of the content servers 52 to each other (based on bandwidth or delay, cable distances, air distances, etc.), ownership or control, and so on.

The content distribution system 50 further includes a content distribution manager 62, a content-originating device 64 (i.e., a content source) for a particular hosted domain, and content requesting devices 66-1, 66-2 (collectively, content requesting devices 66). The content distribution manager 62 provides a user (e.g., an administrator) with control over how the content servers 52 obtain and serve content to the content requesting devices 66 (e.g., browsers through an Internet Service Provider) on behalf of particular host domains (e.g., content from the content-originating device 64). Accordingly, the user can configure particular content servers 52 which are close to the content requesting devices 66 to obtain and serve content such that users of the content requesting devices 66 experience smoother content delivery and faster response times compared to obtaining the content directly from the content-originating device 64. Moreover, such a configuration reduces the load on the content-originating device 64.

The flow of content through the content servers 52 of the content distribution system 50 is determined using virtual content-distribution trees in which the nodes of the trees refer to sets of content servers 52 (e.g., groups of content servers 52 at the locations 60) rather than individual content servers as in the earlier-described conventional CDN 20. Accordingly, the virtual content-distribution trees used by the content distribution system 50 (i) can be smaller than conventional content-distribution trees (e.g., see the conventional tree 40 in FIG. 3), and (ii) can be reused for flows of content through different content servers 52.

The virtual trees provide a general structure for content distribution but do not indicate actual device-level pathways through particular content servers 52. That is, the virtual trees dictate particular locations 60 for content distribution, but do not dictate particular content servers 52 within those locations 60 for content distribution. In order to determine the actual device-level pathways, the content servers 52 (i) form ordered lists of candidate content servers 52 based on location-paths identified by the virtual trees, and then (ii) select particular device-paths from multiple possible device-paths through the identified location-paths. Although path determination is a multi-step process, the overhead burden and resulting network traffic can be significantly less than that in conventional CDNs which involve continuous tree forming and probing communications by each conventional content server (see the conventional content servers 22 of FIGS. 1 and 2) for tree management and maintenance. These features of the invention will be discussed in further detail later.

As mentioned above, the content distribution manager 62 is responsible for configuring the content servers 52 to obtain and serve content on behalf of particular host domains. In particular, for each location 60, the content distribution manager 62 designates a content server 52 to operate as a tree forming leader at that location 60, and a content server 52 to operate as a probing leader at that location 60. In one arrangement, for each hosted domain, the content distribution manager 62 directs a content server 52 at each location 60 to operate as a content fetching leader at that location 60. In another arrangement, the content servers 52 perform procedures (e.g., computations) to determine which content servers 52 operate as content fetching leaders. Although extensive details of the operations of the tree forming leaders, the probing leaders, and the content fetching leaders will be provided later, a short summary of the operation of these leaders will now be presented.

The tree forming leader at each location 60 communicate with other tree forming leaders at other locations 60 and with the probing leaders and the content distribution manager 62 to create the virtual content-distribution trees (i.e., the trees are self-organizing), and to maintain information about such virtual trees on behalf of the other content servers 52 at that location 60. Accordingly, the other content servers 52 at that location 60 can obtain information about particular virtual trees from the tree forming leader at that location 60. Such specialization of content servers 52 reduces the number of tree-forming communications that are exchanged between locations 60 thus (i) lowering network traffic between the locations 60, and (ii) offloading the tree forming overhead from the other content servers 52 at that location 60.

The probing leader at each location 60 communicates with other content servers 52 which operate as probing leaders at other locations 60 in the content distribution system 50 (e.g., lightweight probing periodically every half hour, etc.). Such operation facilitates tree formation and tree maintenance. There is no need for continuous probing communications between the content servers 52 thus reducing communications overhead and network traffic relative to the conventional content servers 22 in the conventional CDN 20 of FIG. 1 which requires frequent and extensive probing communications for fault tolerance (e.g., conventionally every few seconds). Accordingly, the network traffic in each location 60 and between locations 60 is significantly lower than in the conventional CDN 20. Further details of this operation will be provided later.

The content fetching leader at each location 60 obtains content from content servers 52 at other locations 60 and provides that content to other authorized content servers at that location 60 in order to service a particular hosted domain. Accordingly, content can pass from one location 60 to another location 60 only once, and then be distributed locally (i.e., from the content fetching leader to other authorized content servers 52 at the same location 60 which are not the content fetching leader) thus alleviating the need to move multiple copies of the same content across relatively long distances between locations 60. In one arrangement, a device such as the content distribution manager 62 dictates which content servers 52 operate as content fetching leaders. In another arrangement, the content servers 52 perform a procedure or analysis (e.g., a rule-based computation based on hosted domain ID, content server ID, and location ID) to determine which content servers 52 operate as content fetching leaders. Further details of this operation will be provided later.

The existence of the above-described leaders enables each inter-group communication to be performed by a single member (i.e., a specially configured content server 52) of the location 60. That is, the "leader" acts on behalf of all the other servers in the group allowing for a large reduction in the amount of inter-group communications, i.e., communications between locations 60.

A Closer Look at the Components of Each Location

Figure 5:
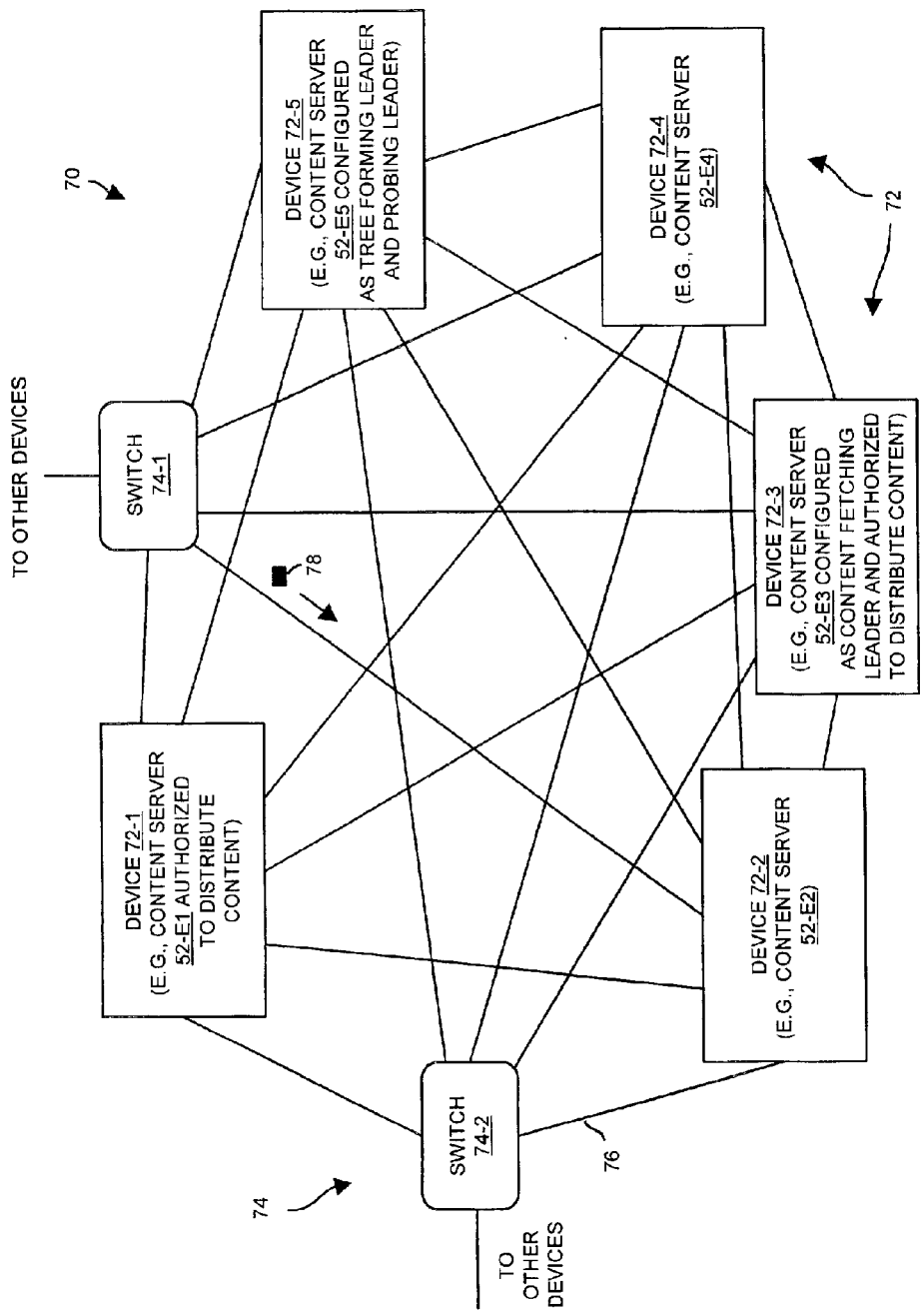
FIG. 5 is a block diagram of a set of devices at a particular location of the content distribution system of FIG. 4

FIG. 5 shows a group 70 of components which is suitable for use as the set of components at location 60-E of FIG. 4 (i.e., content servers 52-E1, . . . , 52-E5, the connecting media 54, etc.). The other locations 60 of the content distribution system 50 of FIG. 4 have similar component groups 70. As shown in FIG. 5, the group of components 70 includes a set of devices 72-1, . . . , 72-5, a set of switches 74-1, 74-2 and point-to-point transmission media 76 which connect the devices 72 and the switches 74 together. The devices 72 are configured to operate as content servers 52 and exchange communications 78 (e.g., packets, cells, frames, etc.) with each other, or with other devices outside the group 70 through the switches 74. By way of example only, the devices 72-1, . . . , 72-5 respectively correspond to the content servers 52-E1, . . . , 52-E5 of FIG. 4.

The content distribution manager 62 (also see FIG. 4) configures the devices 72 such that particular devices 72 perform certain operations on behalf of the group 70. By way of example only, the content distribution manager 62 configures the device 72-5 to operate as a tree forming leader and a probing leader. Additionally, the content distribution manager 62 configures the device 72-3 to operate as a content fetching leader for a particular host domain (or alternatively the content servers 52 determine which will operate as content fetching leaders by computation as described earlier). Furthermore, the content distribution manager 62 authorizes the devices 72-1 and 72-3 to distribute content on behalf of the particular host domain. Other content servers 52 can operate as content fetching leaders for other host domains.

The device 72-5, in its tree forming leader capacity, communicates with the content distribution manager 62 and other tree forming leaders on behalf of all of the components of the group 70 in order to establish the group 70 as a node of a virtual content distribution tree. In contrast to conventional distribution trees, the nodes of the virtual tree refer to groups of devices (e.g., device locations 60) rather than individual devices thus giving rise to the term "virtual". That is, in contrast to the earlier-described conventional CDN 20 in which each content server 22 is a node of the tree 40 (see FIG. 3), the content distribution system 50 uses virtual tree representations in which sets or groups of content servers 52 (one or more of the devices 72) are nodes of the tree. Accordingly, the group 70 of FIG. 5 can be viewed as a single node of a virtual tree rather than multiple nodes thus reducing the tree size. Moreover, since the device 72-5 communicates with the other tree forming leaders and the content distribution manager 62 on behalf of all of the devices 72 in the group 70, the resulting network traffic is less than that of the conventional CDN 20 of FIGS. 1–3 in which each individual content server 22 is a node and each individual content server 22 must communicate to form a tree.

The device 72-5, in its probing. leader capacity, communicates with other devices (i.e., other probing leaders) in order to maintain an understanding of which devices within the content distribution system 50 are available and nearby (i.e., in order to maintain the tree). In one arrangement, the probing period is approximately every half hour. Accordingly, the other devices 72 in the group 70 do not have to perform frequent and extensive probe operations and are free to perform other operations (e.g., more content serving operations).

The device 72-3, in its content fetching leader capacity, fetches content for a particular host domain on behalf of the entire group 70. Recall that the content distribution manager 62 authorizes both devices 72-1 and 72-3 to obtain and serve content for a particular host domain. Even though both devices 72-1 and 72-3 are authorized to obtain and serve content, both of the devices 72-1, 72-3 do not each have to retrieve the content from a more distant device. Rather, in one arrangement, the content distribution manager 62 configures the device 72-3 to initially obtain the content on behalf of both devices 72-1, 72-3, and configures the device 72-1 to subsequently obtain the content from the device 72-3. In another arrangement, each content server 52 performs a procedure to determine which content servers 52 operate as content fetching leaders. As a result, the content carrying traffic between groups 70 (i.e., between the locations 60 of FIG. 4) is minimized.

In one arrangement, the content distribution system 50 distributes content in a unicast or IP-multicast manner between locations 60. Then, the content distributes in a broadcast manner within each location 60. Accordingly, in this arrangement, the distribution of content uses two different communication mechanisms.

It should be further understood that the virtual trees can be nested or employed recursively (i.e., one virtual tree within another). In some arrangements, intra-location distribution is performed using nested virtual trees where the nested trees span individual servers in locations, or groups of servers.

Performance Comparison Between CDNs

Figure 1:
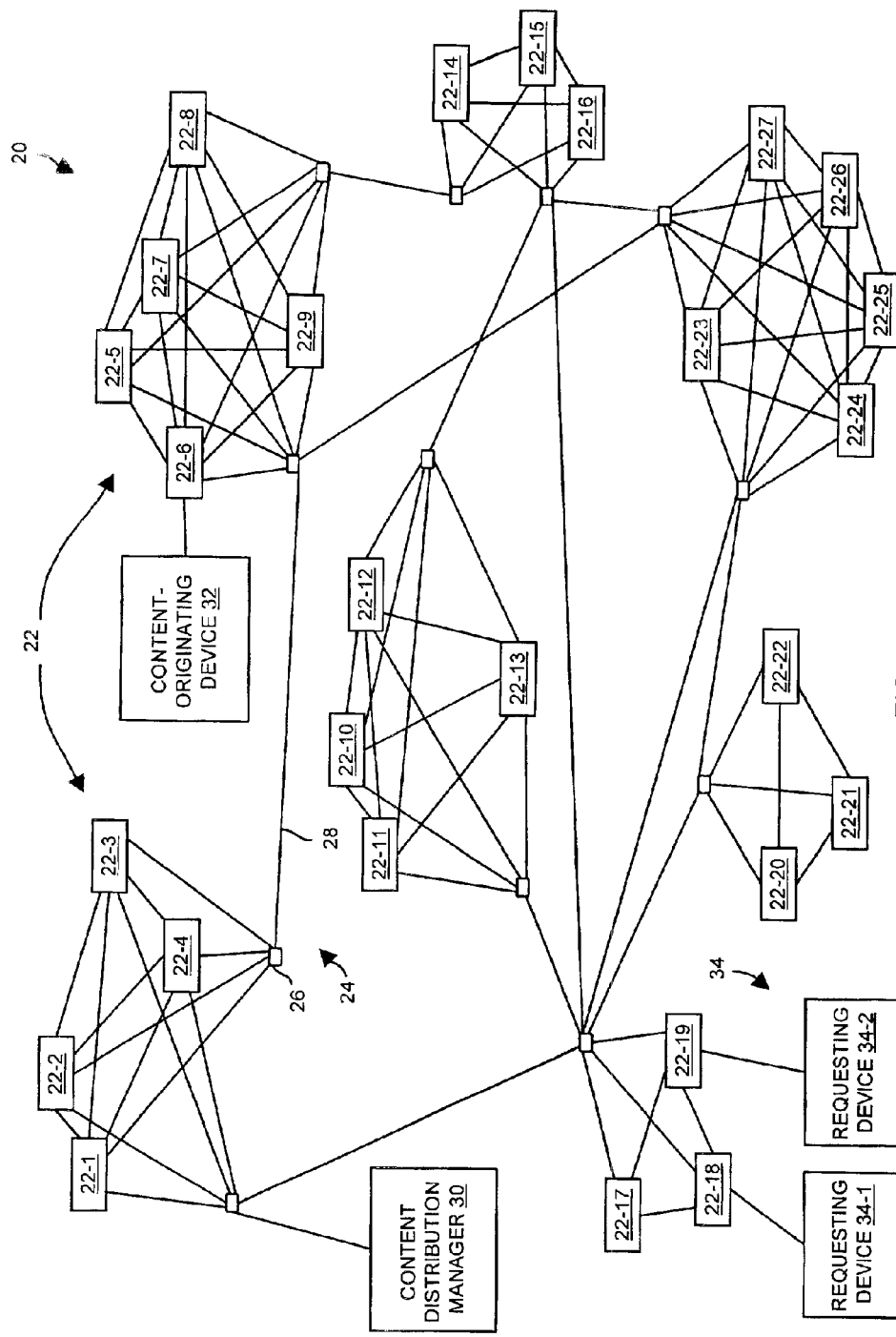
FIG. 1 is a block diagram of a conventional content distribution system.
Figure 2:
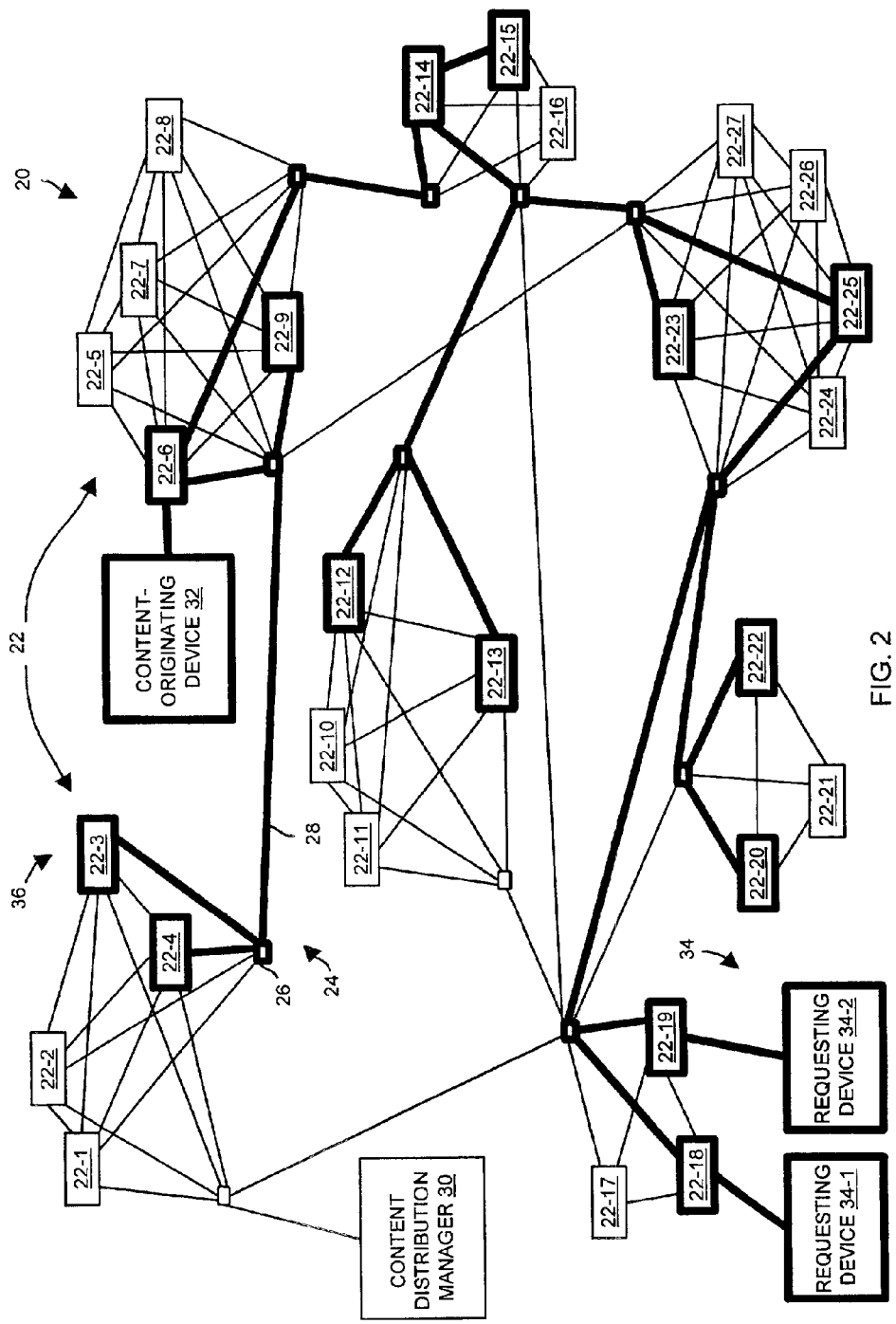
FIG. 2 is a block diagram of the conventional content distribution system of FIG. 1 highlighting a content distribution layout for distributing particular content.
Figure 3:
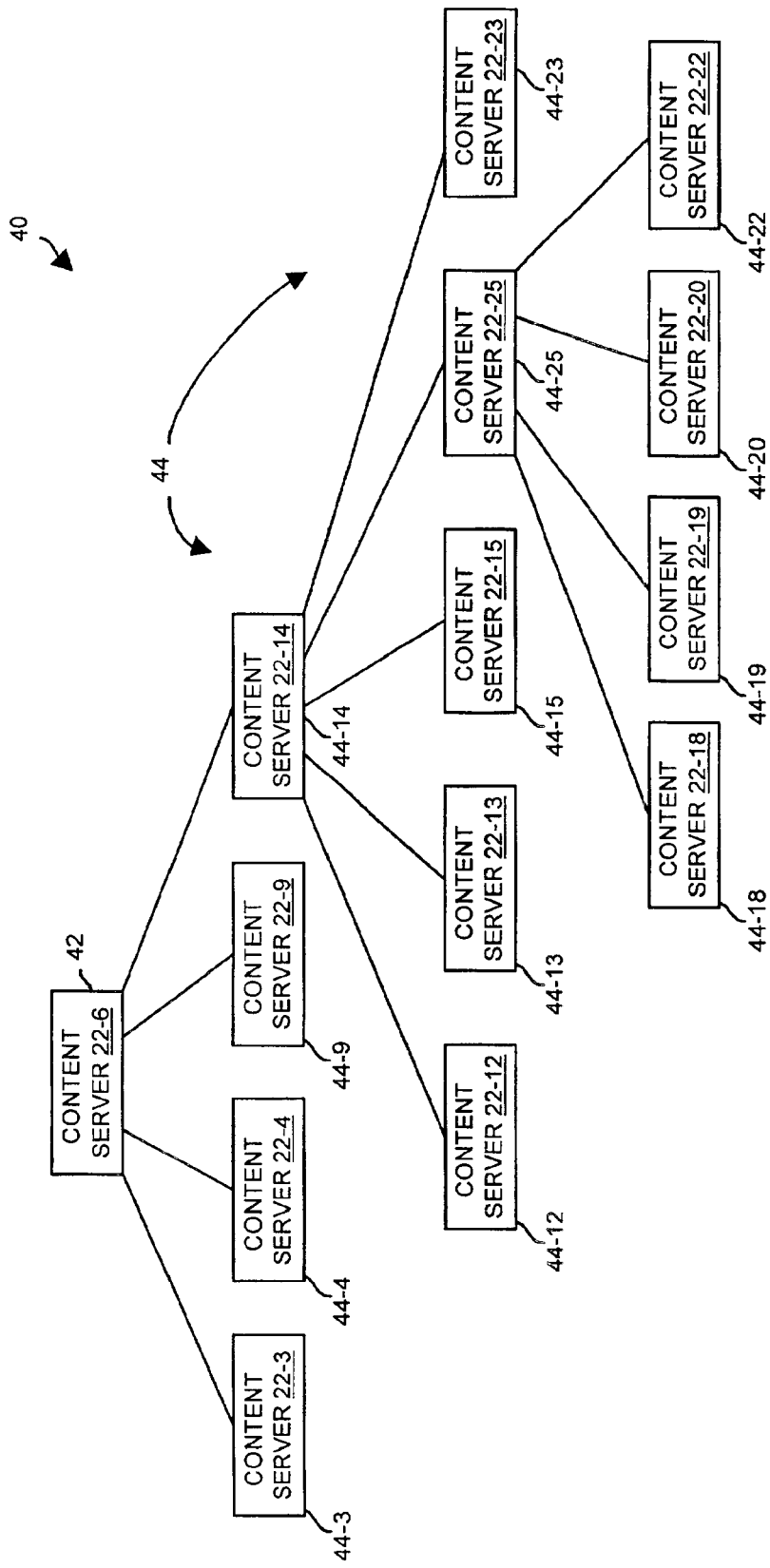
FIG. 3 is a content-distribution tree representation of the highlighted content distribution layout of FIG. 2.

For comparison purposes, the content distribution system 50 of FIG. 4 was provided with a similar topology to that of the earlier-described conventional CDN 20 of FIGS. 1 through 3. However, it should be understood that other topologies are suitable for use as well for the content distribution system 50.

Figure 6:
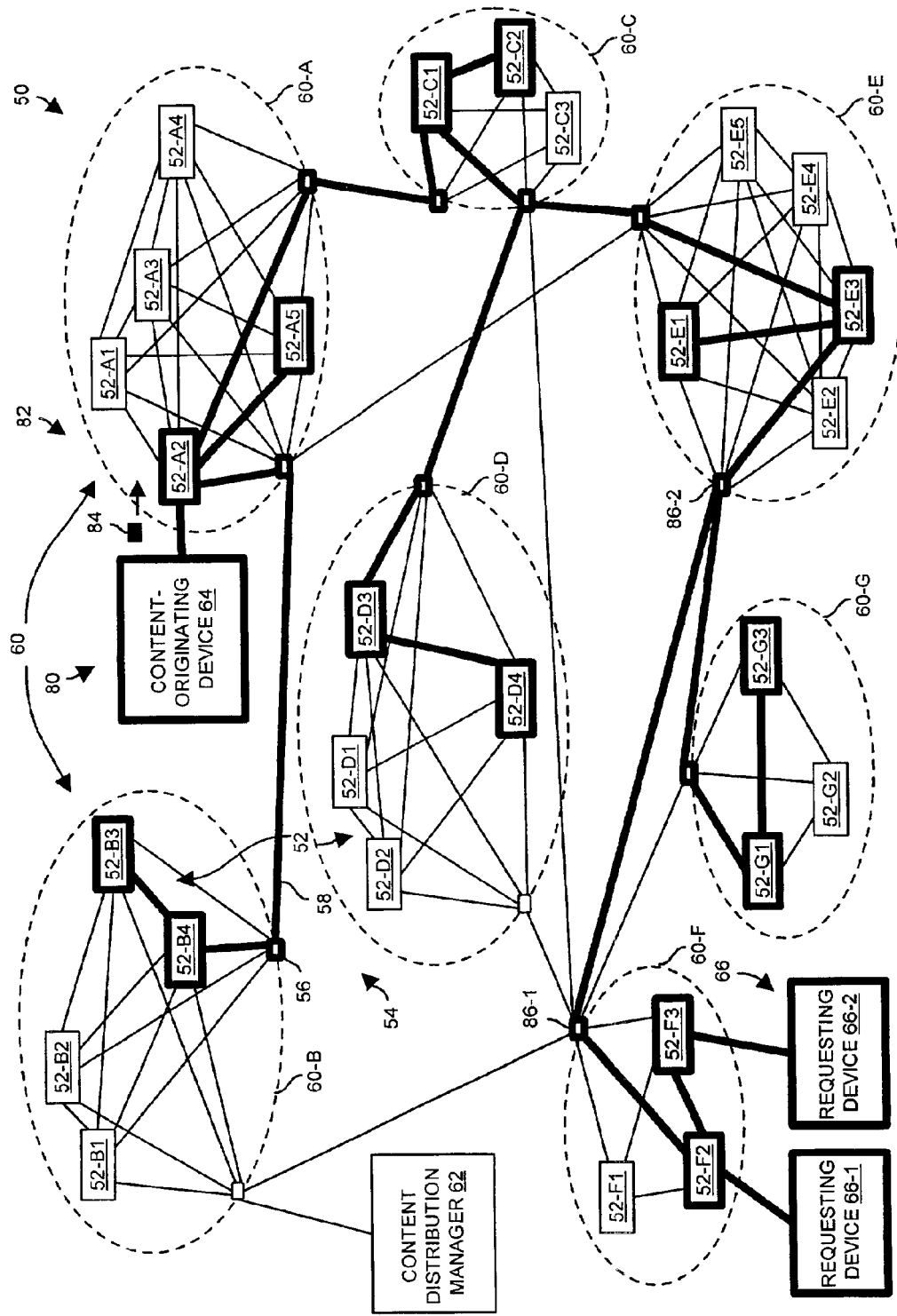
FIG. 6 is a block diagram of the content distribution system of FIG. 4 highlighting a content distribution layout through locations of the system when distributing content for a particular host domain.

FIG. 6 shows a content distribution layout 80 for distributing content within the content distribution system 50 of FIG. 4 for a particular host domain. Such a content distribution layout 80 illustrates the flow of content for that host domain (i.e., content provided by the content-originating device 64).

Before creating the content distribution layout 80, the owner and operator of the particular host domain identifies particular content servers 52, i.e., a subset 82 of content servers 52, through which it would like to serve content. Suppose that the owner and operator of the particular host domain selects the content servers 52 which correspond to the conventional content servers 22 of the conventional CDN 20 of FIG. 2 which serve content for the content-originating device 32. In particular, suppose that the owner and operator of the particular host domain selects the content servers 52-A2, 52-A5, 52-B3, 52-B3, 52-C1, 52-C2, 52-D3, 52-D4, 52-E1, 52-E3, 52-G1, 52-G3, 52-F2 and 52-F3 (shown in bold in FIG. 6) to obtain and serve content 84 to requesting devices 66 which are capable of accessing the content distribution system 50 (e.g., the requesting devices 66-1, 66-2). To this end, a user. identifies the selected content servers 52 to the content distribution manager 62 (e.g., through a graphical user interface) and also a root location, and the content distribution manager 62 determines whether a virtual content-distribution tree containing the same root location and member locations presently exists which covers the selected content servers 52. If such a virtual tree presently exists, the content distribution manager 62 reuses that virtual tree to distribute content for the particular host domain However, if such a virtual tree does not exist, the content distribution manager 62 directs the content servers 52 of the content distribution system 50 to form such a virtual tree. In one arrangement, the content distribution manager 62 directs the tree forming leaders of the various locations 60 to communicate with each other to form a new virtual tree. Tree formation techniques which are suitable for use by the content distribution manager 62 and the tree forming content servers 52 are described in U.S. patent application Ser. No. 09/864,487, filed May 24, 2001, which is entitled "Methods and Apparatus for Managing the Arrangement of Nodes in A Network" and which is assigned to Cisco Systems, Inc. of San Jose, Calif., the teachings of which are hereby incorporated by reference in their entirety.

It should be understood that the virtual trees can initially have a "bushy" structure (e.g., be only one level deep), and then (in a self-organizing manner) reorganize into lengthier virtual trees in response to a number of factors such as time for particular probing leaders to communicate with each other, changing network conditions, etc. Nevertheless, even with large numbers of content servers 52, the virtual trees may not be very deep. For example, for a splitting factor of 10 on average at each level in the tree (i.e., each parent has 10 children), the depth of a virtual tree containing 1000 locations 60 is only four levels.

It should be further understood that the content distribution system 50 includes fault tolerance features that make it unnecessary for the content servers 52 to reorganize the virtual content-distribution trees to provide fault tolerance. This will be explained in further detail later.

Figure 7:
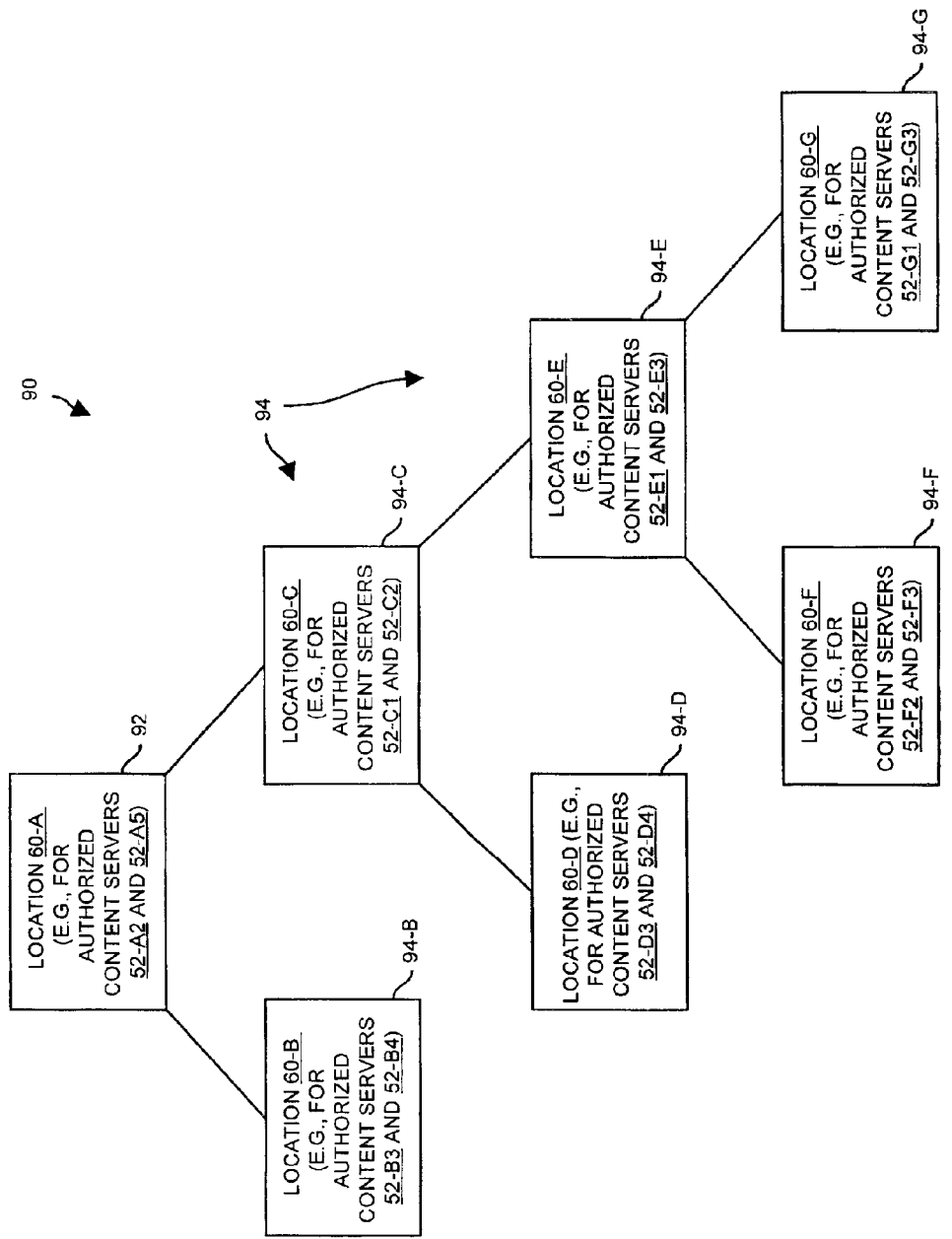
FIG. 7 is a virtual content-distribution tree representation of the highlighted content distribution layout of FIG. 6.

FIG. 7 shows a virtual content-distribution tree which is suitable for the content distribution system 50. As shown, the virtual tree 90 includes a root node 92 which represents the location 60-A (i.e., the first location 60-A to obtain content), and non-root nodes 94 which represent the other locations 60. Nodes 94-B and 94-C are considered child nodes of the root node 92. The root node 92 is considered a parent node of the nodes 94-B and 94-C. Similarly, the nodes 94-D and 94-E are considered child nodes of the node 94-C, and so on.

Since each node 92, 94 of the virtual tree 90 represents a location 60 (i.e., a set of devices such as the group 70 of FIG. 5) rather than an individual content server 52 as in a conventional CDN, multiple content servers 52 carrying content at a particular location 60 are still represented as a single node 92, 94. Accordingly, the virtual tree 90 tends to be smaller than the conventional content-distribution tree (see the tree 40 of FIG. 3). Furthermore, the virtual tree 90 covers multiple possible device-paths through the locations 60.

By way of example only, the content-originating device 64 (the content source for content of the particular host domain) provides the content 84 directly to the content server 52-A2 of the location 60-A. In one arrangement, the content server 52-A2 (i.e., the root location) is purposefully a well-provisioned (e.g., reliable and well-supported) and well-positioned site since it is the first device to distribute content after the content-originating device 64. The other authorized content servers 52 then obtain and serve content from the content server 52-A2 or other content servers 52 as illustrated by the bolded pathways in FIG. 6.

It should be understood that content flows through the content distribution system 50 in accordance with the virtual tree 90. For example, since the node 92 corresponding to the location 60-A is a parent of the nodes 94-B, 94-C which correspond to the locations 60-B, 60-C (see FIG. 7), the content 84 could flow from the location 60-A to the locations 60-B, 60-C. Similarly, since the node 94-C corresponding to the location 60-C is a parent of the nodes 94-D, 94-E which correspond to the locations 60-D, 60-E, the content 84 flows from the location 60-C to the locations 60-D, 60-E, and so on. With this in mind, it should be understood that content flows only once between locations 60. For example, there is only one pathway between the location 60-F and the location 60-E since the node 94-F (which corresponds to the location 60-F) is a child of the node 94-E (which corresponds to the location 60-E). In contrast, in the conventional CDN 20 of FIG. 2, content can flow twice, i.e., once from the conventional content server 22-25 to the conventional content server 22-18, and again from the conventional content server 22-25 to the conventional content server 22-19. Accordingly, the content distribution system 50 requires less content distribution traffic between locations 60 (i.e., requires less transmissions across long distances) than the conventional CDN 20 thus making more efficient use of resources (e.g., bandwidth along major connections between locations 60) than the conventional CDN 20.

As mentioned above, the virtual content-distribution tree 90 (FIG. 7) is smaller than the conventional distribution tree 40 (FIG. 3). This feature is a reflection of the lower number of nodes (due to grouping the content servers 52 into locations 60 for the content distribution system 50 rather than treating each content server 22 as a node in the conventional CDN 20) and fewer number of pathways between the nodes (due to the absence of any intralocation pathways for the virtual tree 90). Accordingly, although the content distribution system 50 includes, by way of example only, the same number of content servers as the conventional CDN 20, the content distribution system 50 tends to use smaller (due to grouping content servers 52 into locations 60) and fewer trees (due to tree sharing) to coordinate content distribution. Moreover, and as will be explained in further detail shortly, the same virtual content-distribution tree can be used for distributing content for different host domains even if particular content servers 52 distributing the content are different.

It should be understood that the content servers 52 of the virtual trees should be arranged so that child nodes do not need to pass through firewalls in order to obtain information from parent nodes. That is, leaders request information only from leaders above it in the virtual tree. Accordingly, the flow of information facilitates (rather than inhibits) the propagation of content and information in the downward direction from the root to the leaves of the virtual tree 90. Further details of how the same tree can be reused will now be described with reference to FIGS. 8 and 9.

Furthermore, it should be understood that the communications for propagating information about the content servers 52 can occur infrequently (e.g., every few minutes). When such communications occur infrequently, the size of such messages is of relatively little concern, i.e., the sizes can be on the order of a few thousand bytes for inter-location communications. Although it is possible that the information in such communications is stale, this is not problematic since, among other things, (i) node placements within the virtual tree change infrequently (much less often than each communication period), (ii) there are other fault tolerance mechanisms in place (as will be described later), and (iii) incorrect information does not cause problems (e.g., a new addition to the virtual tree does not cause a problem in content distribution, etc.).

Figure 8:
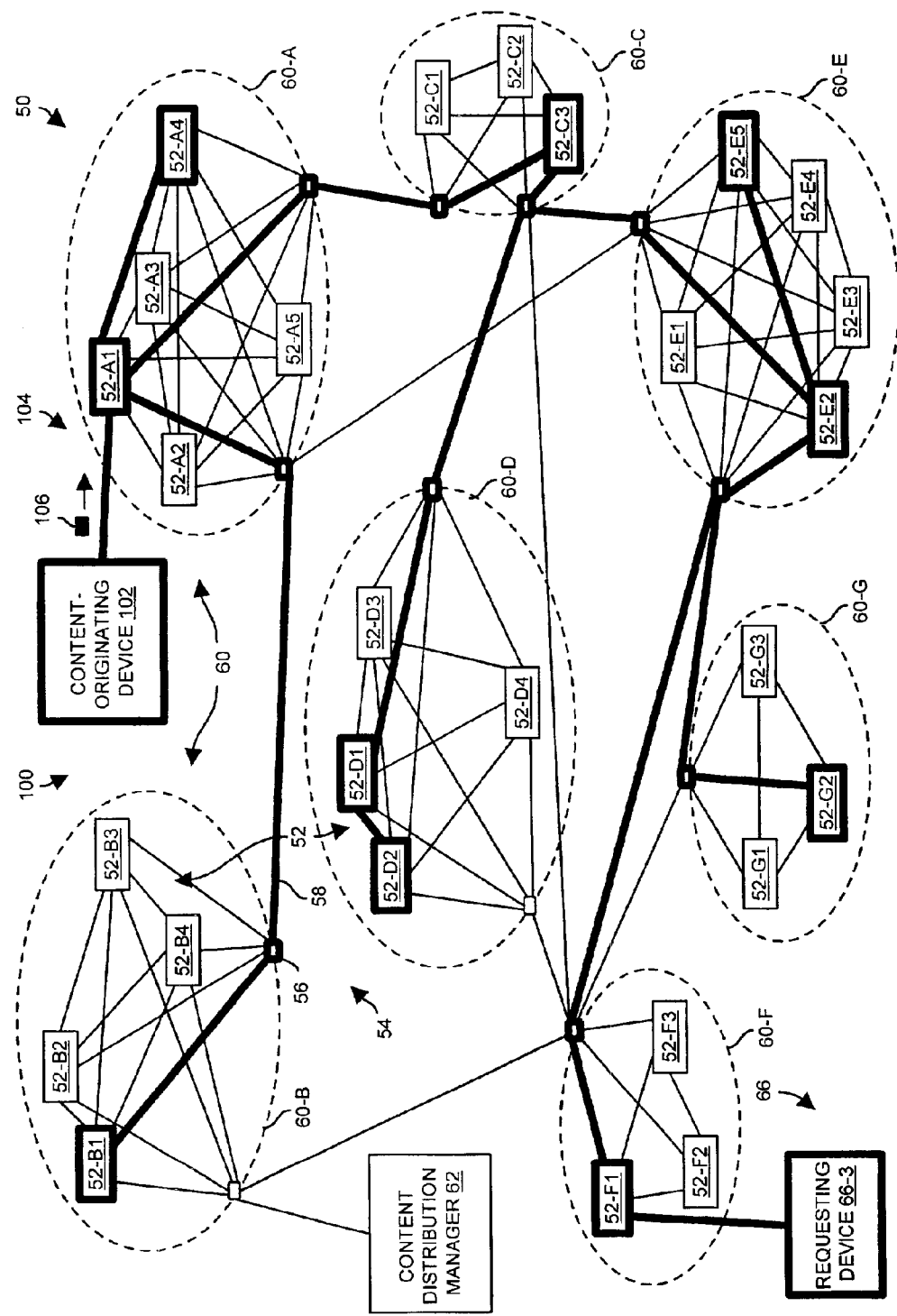
FIG. 8 is a block diagram of the content distribution system of FIG. 4 highlighting another content distribution layout through locations of the system when distributing content for another host domain.

FIG. 8 shows a content distribution layout 100 for distributing content for a host domain that is different than that of FIG. 6. By way of example only, the content distribution layout 100 includes a content-originating device 102 (a new content source) that is different than the content-originating device 64 of the content distribution layout 80 of FIG. 6. In the content distribution layout 100, the content distribution manager 62 has configured a subset 104 of content servers 52 to distribute content 106 from the content-originating device 102. In particular, the content distribution manager 62 configures the content servers 52-A1, 52-A4, 52-B1, 52-C3, 52-D1, 52-D2, 52-E2, 52-E5, 52-F1 and 52-G2 (shown in bold in FIG. 8) to obtain and serve the content 106 to requesting devices 66 (e.g., the requesting device 66-3).

Figure 9:
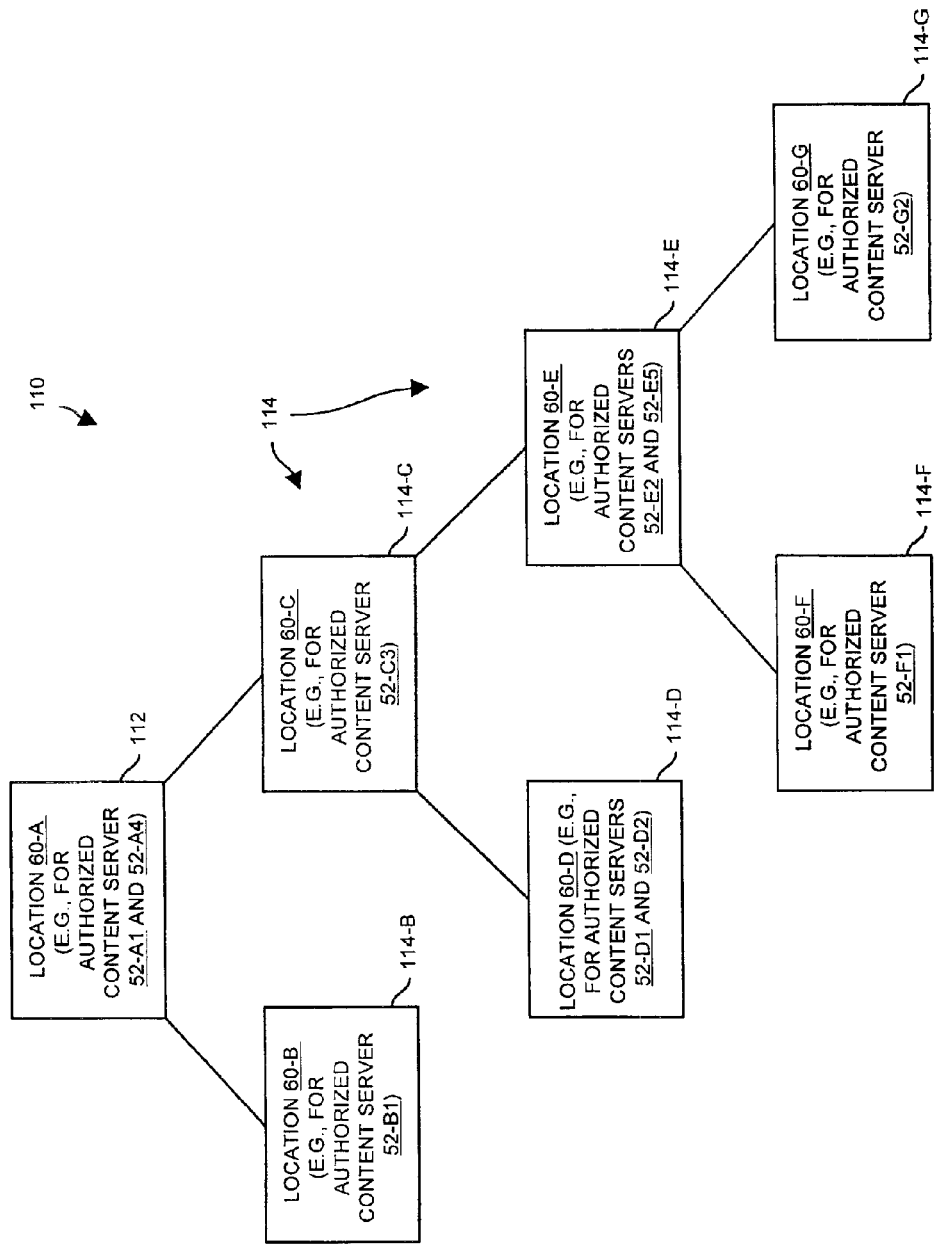
FIG. 9 is a virtual content-distribution tree representation of the highlighted content distribution paths of FIG. 8.

FIG. 9 shows a virtual content-distribution tree 110 for the content distribution layout 100 of FIG. 8. The distribution tree 110 includes a root node 112 which represents the location 60-A (i.e., the location 60 which receives the content 106 directly from the content-originating device 102), and non-root nodes 114 which represent other locations 60 (i.e., locations 60 which indirectly receive the content 106 from the content-originating device 102). For example, the node 114-B represents the location 60-B, the node 114-C represents the location 60-C, and so on.

It should be understood that the content distribution layouts 80, 100 are clearly different, i.e., the content distribution layouts 80, 100 include different content servers 52. Nevertheless, based on a comparison of the virtual content-distribution tree 110 of FIG. 9 with the virtual content-distribution tree 80 of FIG. 7, it should be further understood that the shapes and configurations of the virtual content-distribution trees 110, 80 are the same. That is, each virtual content-distribution tree 110, 80 includes a root node 112, 92 that represents the location 60-A, non-root child nodes 114-B, 94-B that represent the location 60-B, and so on. Accordingly, the content distribution system 50 does not need to manage and maintain two virtual trees for the two content distribution layouts 80, 100. Rather, the content distribution system 50 can use a single data structure (or set of data structures) to identify the virtual trees 110, 80 for multiple content distribution layouts, i.e., multiple host domains. That is, the content distribution system 50 can reuse (or share) the same virtual tree to handle distribution of content for the two content distribution layouts 80, 100, i.e., for the content-originating device 102 (one host domain), and to handle distribution of content for the content-originating device 64 (another host domain). Such reuse of virtual trees saves overhead resources (e.g., memory, processing time, etc.) which would otherwise be required to track, manage and create more virtual trees. In particular, the amount of work (e.g., probing) can be performed once on behalf of content distribution for multiple host domains thus minimizing the amount of probing work and minimizing network traffic.

It should be understood from the description above that trees can be shared. In particular, tree sharing is possible when they include the same set of locations and the same designated root location. Further details of the invention will now be provided with reference to FIG. 10.

Construction of the Content Servers

Figure 10:
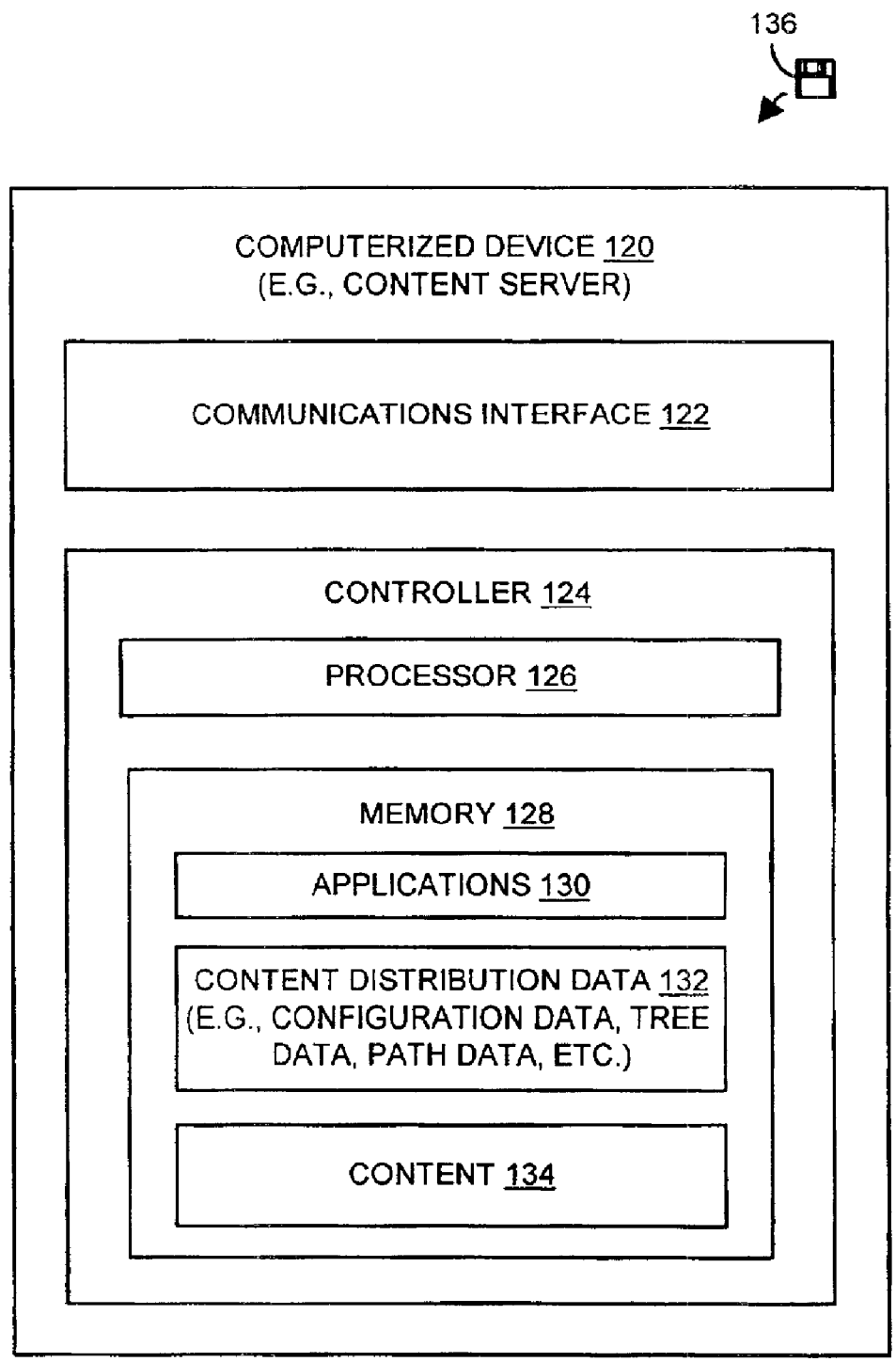
FIG. 10 is a block diagram of a computerized device which is suitable for use as a content serving device of the content distribution system of FIG. 4.

FIG. 10 shows a computerized device 120 which is suitable for use for each content server 52 (see FIG. 4) and thus each device 72 (see FIG. 5). The computerized device 120 includes a communications interface 122 (e.g., a set of input ports and a set of output ports) and a controller 124. The controller 124 includes a processor 126 and memory 128. The memory 128 stores a set of applications 130 (e.g., an operating system for allocating resources, a control program/engine, a graphical user interface, etc.), content distribution data 132 and buffered content 134. In one arrangement, the memory 128 is exclusively volatile memory (e.g., semiconductor memory) for minimal information retrieval latency. In another arrangement, the memory 128 is a combination of volatile memory and non-volatile memory (e.g., disk memory) for increased capacity, lower storage costs and/or lower power consumption.

In one arrangement, the computerized device 120 obtains the applications 130 from a computer program product 136 (e.g., a CDROM, a set of diskettes, a set of magnetic tapes, a download over a network, etc.). The applications 130 include code (executable commands, text instructions that can be interpreted, etc.) which run on the processor 126. In particular, the applications 130 include instructions that, when carried out by the processor 126, can cause the computerized device 120 to operate as a tree forming leader, a probing leader, a content fetching leader, and/or a content server authorized to serve content on behalf of one or more host domains. When the computerized device 120 operates as one or more of the above, the computerized device 120 can communicate with components of the content distribution system 50 (e.g., other computerized devices 120 configured as content servers 52) in order to obtain tree information and obtain content. In one arrangement, the applications 130 include separate modules which handle particular functions of the content server 52, e.g., a tree forming module to operate the computerized device 120 as a tree former, a distribution-path subsystem to operate the computerized device as a device-path former, etc.

The content distribution data 132 is a set of operating parameters used by the applications 130 during normal operation. The content distribution data 132 dictates whether the computerized device 120 is to operate as a tree forming leader, a probing leader, a content fetching leader, etc. If the computerized device 120 is authorized to obtain and serve content, the content distribution data 132 includes information about the content distribution system 50 such as locations where the content can be obtained. Some of this information is gathered from neighboring content servers 52 (e.g., other computerized devices 120). Details of how the computerized device 120 operates will be described shortly after a further explanation of the content distribution manager 62 (see FIG. 6) is provided.

The Content Distribution Manager

FIG. 11 shows a table 140 which is stored in the content distribution manager 62 and in each tree forming leader of the content distribution system 50. The table 140 includes a series of entries 142 which correspond to different host domains which are served by the content distribution system 50. Each entry 142 includes a host domain field 144, a list field 146 and a tree field 148. For each entry 142, the contents of the host domain field 144 identify a particular host domain, the contents of the list field 146 identify a list of content servers 52 which are authorized to obtain and serve content for that host domain, and the contents of the tree field 148 identify a particular virtual content distribution tree for content flow through the content distribution system 50. For example, based on an entry 142 in the table 140, the content servers 52 which are authorized to obtain and serve content for the host domain "www.hd-3.com" are content servers 52-A3, 52-B2, 52-B3, 52-F1, 52-F2, 52-F3, 52-C1, 52-E3 and 52-E5. The flow of content from the content originating-device for the host domain "www.hd-3.com" (i.e., the content source) is based on a virtual content-distribution tree #17. Further details of how the content distribution system 50 uses virtual trees will now be described.

Suppose that the owner of a host domain "www.hd-1.com" at the content-originating device 62 wishes to hire the owner and operator of the content servers 52 to obtain and serve content for access by users of requesting devices 66 (see FIG. 6). A user of the owner and operator of the content servers 52 enters a list of the content servers 52 which are authorized to obtain and serve the content for the host domain on the content distribution manager 62 (e.g., a system administrator selects the content servers 52 using a graphical user interface). The content distribution manager 62 then determines whether a virtual tree presently exists which covers the listed content servers 52. If such a virtual tree does not exist, the content distribution manager 62 directs the tree forming leaders to create a virtual tree that covers the listed content servers 52 in a self-organizing manner. For example, the content distribution manager 62 can create the virtual content-distribution tree 70 of FIG. 5 to cover the content servers 52 shown in bold in FIG. 6. Such tree formation can involve communications between the content servers 52 of the content distribution system 50 which are configured to operate as tree forming leaders of particular locations 60 (also see FIGS. 4 and 6).

However, if such a virtual tree already exists (e.g., because the same virtual tree was used earlier to distribute content through the content distribution system 50), the content distribution manager 62 uses the earlier-created virtual tree. For example, the content distribution manager 62 can use the same virtual tree 70 of FIG. 5 to cover the content servers 52 shown in bold in FIG. 8 (a comparison of the size and shape of the virtual tree 90 of FIG. 7 which corresponds to the distribution layout 80 of FIG. 6 with that of the virtual tree 70 of FIG. 5 which corresponds to the distribution layout 100 of FIG. 8 shows that the two virtual trees 80, 100 have the same size and shape).

For illustration purposes, suppose that content distribution manager 62 creates a new entry 142 in response to formation of the virtual tree #23 for distributing content on behalf of the host domain "www.hd-1.com" (see the table 140 of FIG. 11). As shown, the virtual tree #23 covers the content servers 52 which are authorized to obtain and serve content on behalf of the particular host domain "www.hd-1.com". Subsequently, suppose that the content distribution manager 62 is able to reuse the same virtual tree #23 for another host domain "www.hd-2.com". Accordingly, the content distribution manager creates another new entry 142 to the table 140 to reflect the reuse of tree #23 for the host domain "www.hd-2.com".

After the content distribution manager 62 creates a new entry 142 in the table 140 for content distribution for a particular host domain, the content distribution manager 62 provides the tree information within the new entry 142 to the tree forming leaders of the content distribution system 50. The tree forming leaders, which keep local copies of a table similar to the table 140, update their copies to reflect the new entry 142. The tree forming leaders are now capable of providing tree information to content servers 52 at their locations, e.g., location-paths leading from the content servers 52 back to the content-originating devices 64 by referencing their local tables.

When the content distribution manager 62 forms a new entry 142 in the table 140, the content distribution manager 62 also configures some of the listed content servers 52 (i.e., the content servers 52 listed in the list field 146 of that entry) to operate as content fetching leaders to obtain content from other locations 60, and other listed content servers 52 (i.e., authorized content servers 52) to obtain content from the content fetching leaders in their locations 60. In one arrangement, the earliest-listed content server 52 at each location 60 in the list field 146 is the content fetching leader. Further details of how the content distribution manager 62 configures the content servers 52 will now be described with reference to FIGS. 12 through 20.

Configuration of the Computerized Device as a Content Server

Figure 12:
FIG. 12 is a format for a set of parameters which is suitable for use by the computerized device of FIG. 10.

FIG. 12 shows a set 150 of operating parameters which is suitable for use as at least a portion of the content distribution data 132 used by the computerized device 120 (also see FIG. 10). The set 150 of operating parameters includes configuration data 152 and tree data 154. The configuration data 152 includes a tree forming leader variable 156, a content fetching leader variable 158 and a probing leader variable 160. (It should be understood that the content fetching leader variable is a table with a "YES/NO" field for each hosted domain.) In a computerized device 120, the values of these variables 156, 158, 160 determine how the computerized device 120 operates. For example, if the tree forming leader variable 156 is set to "YES", the computerized device 120 operates as a tree forming leader of its particular location 60 (also see FIG. 5). If the tree forming leader variable 156 is set to "NO", the computerized device 120 does not operate as a tree forming leader of the location 60. Similarly, if the content fetching leader variable 158 is set to "YES" for a particular hosted domain (keeping in mind that the variable 158 is actually a table), the computerized device 120 operates as a content fetching leader of its particular location 60 for that hosted domain. If the content fetching leader variable 158 is set to "NO" for that hosted domain, the computerized device 120 does not operate as a content fetching leader of the location 60 for that hosted domain. Furthermore, if the probing leader variable 160 is set to "YES", the computerized device 120 operates as a probing leader of its particular location 60. If the probing variable 160 is set to "NO", the computerized device 120 does not operate as a probing leader of the location 60. The variables 156, 158, 160 can be implemented as designated bits in a control register (e.g., "YES" if the bit is set and "NO" if the bit is cleared), or the like. In one arrangement, the content distribution manager 62 attempts to assign different content servers 52 as tree forming leaders and content fetching leaders in order to prevent overburdening any particular content server 52. In an alternative arrangement, the content servers 52 perform computations to determine which operate as content fetching leaders.

For the computerized device 120, the set of operating parameters 150 further includes a list 161 of authorized host domains. The computerize device 120 is authorized to operate as a content server 52 (i.e., to obtain and server content) for each host domain on the list 161 of authorized host domains.

The tree data 154 includes a location identifier 162, a device identifier 164 and optional constraints 166. For a particular computerized device 120, the value of the location identifier 162 identifies the location of the computerized device 120 within the content distribution system 50. For example, with reference to FIG. 5, all of the content servers 52 in the location 60-A can be implemented as computerized devices 120 which have the same location identifier 162 (e.g., the same bit pattern), all of the content servers 52 in the location 60-B can be implemented as computerized devices 120 which have a different location identifier 162 compared to that for the location 60-A (e.g., a different bit pattern), and so on.

Additionally, for a particular computerized device 120, the value of the device identifier 164 uniquely identifies the computerized device 120 within the content distribution system 50. In one arrangement, the value of the device identifier 162 is a unique number from the perspective of the content distribution manager 62 thus enabling the content distribution manager 62 to uniquely identify each content server 52 in the content distribution system 50 (e.g., a unique bit pattern).

Furthermore, the optional constraints 166 include special limitations that the content distribution manager 62 can impose on the computerized device 120. For example, the content distribution manager 62 can direct the computerized device 120 that its location should operate as a leaf only, or force the location of the computerized device 120 to be a child or ancestor of a location of particular content server 52 (e.g., individually set or cleared bits in a dedicated region of a control register). Such features provide additional flexibility and control over the operation of the computerized device 120.

When the content distribution system 50 includes computerized devices 120 as the content servers 52, the content distribution manager 62 (under user control) configures the computerized devices 120 with the content distribution data 132 (e.g., programming one or more control registers, passing the variables to the content servers using one or more instruction calls, combinations thereof, etc.). In particular, as mentioned earlier, the content distribution manager 62 selects one computerized device 120 at each location 60 to operate as a tree forming leader, and one computerized device 120 at each location 60 to operate as a probing leader. In one arrangement, the content distribution manager 62 further selects computerized devices 120 at the locations 60 to operate as content fetching leaders.

For example, at the location 60-E of FIG. 6, the content distribution manager 62 can configure the content server 52-E5 to operate concurrently as a tree forming leader and a probing leader. The content distribution manager 62 also can configure the content server 52-E3 to operate as a content fetching leader and to serve content for a host domain "www.hd-1.com", and can configure the content server 52-E1 to obtain and serve content for the host domain "www.hd-1.com". The content distribution manager 62 also can configure the content server 52-E2 to operate as a content fetching leader and to serve content for the host domain "www.hd-2.com", and the content server 52-E5 to obtain and serve content for the host domain "www.hd-2.com".

Figure 13:
FIG. 13 is a set of configuration parameters which is suitable for use by the computerized device of FIG. 10 when configured to operate as a tree forming leader and a probing leader.

FIG. 13 is an example set of operating parameters 170 which is suitable for configuring a computerized device 120 to operate as a tree forming leader and a probing leader, i.e., to provide tree information and to periodically probe the content distribution system 50 to facilitate content distribution within the content distribution system 50. By way of example only, the set of operating parameters 170 configures the computerized device 120 to operate as the content server 52-E5 (also see FIGS. 4, 6, 8 and 9). As shown in FIG. 13, the value of the device identifier 164 identifies the computerized device 120 as the content server 52-E5, and the value of the location identifier 162 identifies location 60-E as the location for the computerized device 120. Additionally, the tree forming leader and probing leader variables 156, 160 are set to "YES", and the content fetching leader variable 158 (e.g., a table) is set to "NO" (i.e., set to "NO for each hosted domain). Accordingly, the computerized device 120 is configured to operate as both a tree forming leader and a probing leader, but not operate as a content fetching leader. Further details of the invention will now be provided with reference to FIG. 14.

Figure 14:
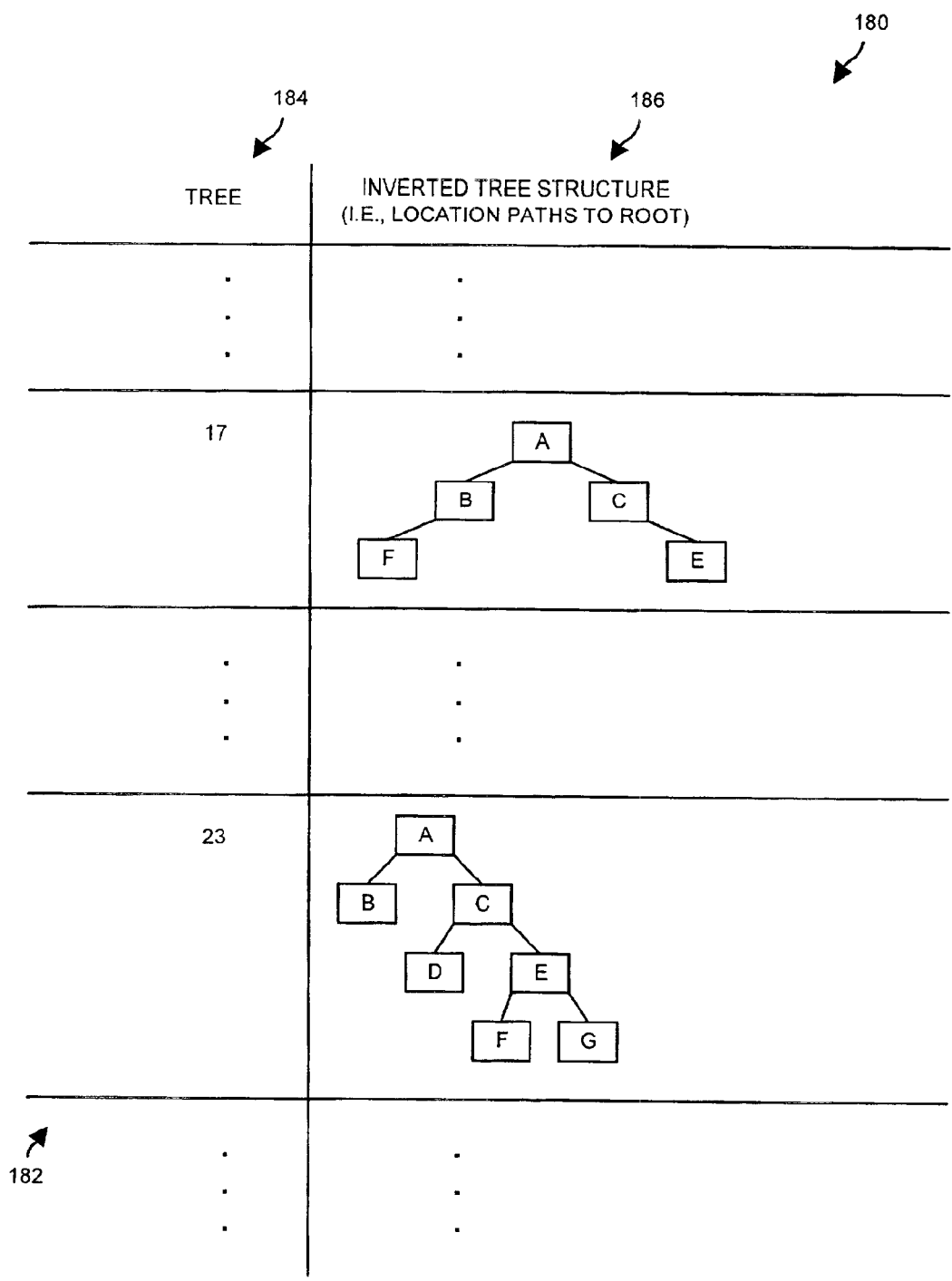
FIG. 14 is a table of virtual content-distribution trees which is accessible in by the computerized device of FIG. 10 when configured to operate as a tree forming leader.

FIG. 14 shows a table 180 of trees which is stored and maintained by each computerized device 120 which is configured to operate as a tree forming leader (e.g., the above-described computerized device which is configured to operate as the content server 52-E5. The table 180 of trees includes a series of entries 182. Each entry 182 includes a tree identifier field 184, and a structure field 186. The contents of the tree identifier field 184 identifies a particular tree, and the contents of the structure field 186 (e.g., a data structure or a pointer to a data structure) provides a description of the structure of that particular tree. By way of example only, the table 180 includes an entry 182 for a tree #17 and a tree #23. The contents of the structure field 186 for the entry 182 for the tree #23 describes the earlier-described distribution layouts 80 and 100 (see FIGS. 6 and 8).

Figure 15:
FIG. 15 is a set of configuration parameters which is suitable for use by the computerized device of FIG. 10 when configured to operate as an authorized content serving device.

Since the computerized device 120 which is configured to operate as the content server 52-E5 is a tree forming leader, the computerized device 120 stores the table 180 of trees and is capable of providing tree information to content servers 52 in the same location 60. FIG. 15 shows a set of parameters 190 which are suitable for configuring another computerized device 120 to obtain and serve content on behalf of a particular host domain "www.hd-1.com". By way of example only, the computerized device 120 is not configured to operate as any type of leader. Accordingly, the content server 52-E1 communicates with the tree forming leader (i.e., the content server 52-E5) for tree information in order to understand the structure of the tree for content distribution, and the content fetching leader for the host domain "www.hd-1.com" for content (i.e., the content server 52-E3). Each of these communications will now be discussed in further detail.

Figure 16:
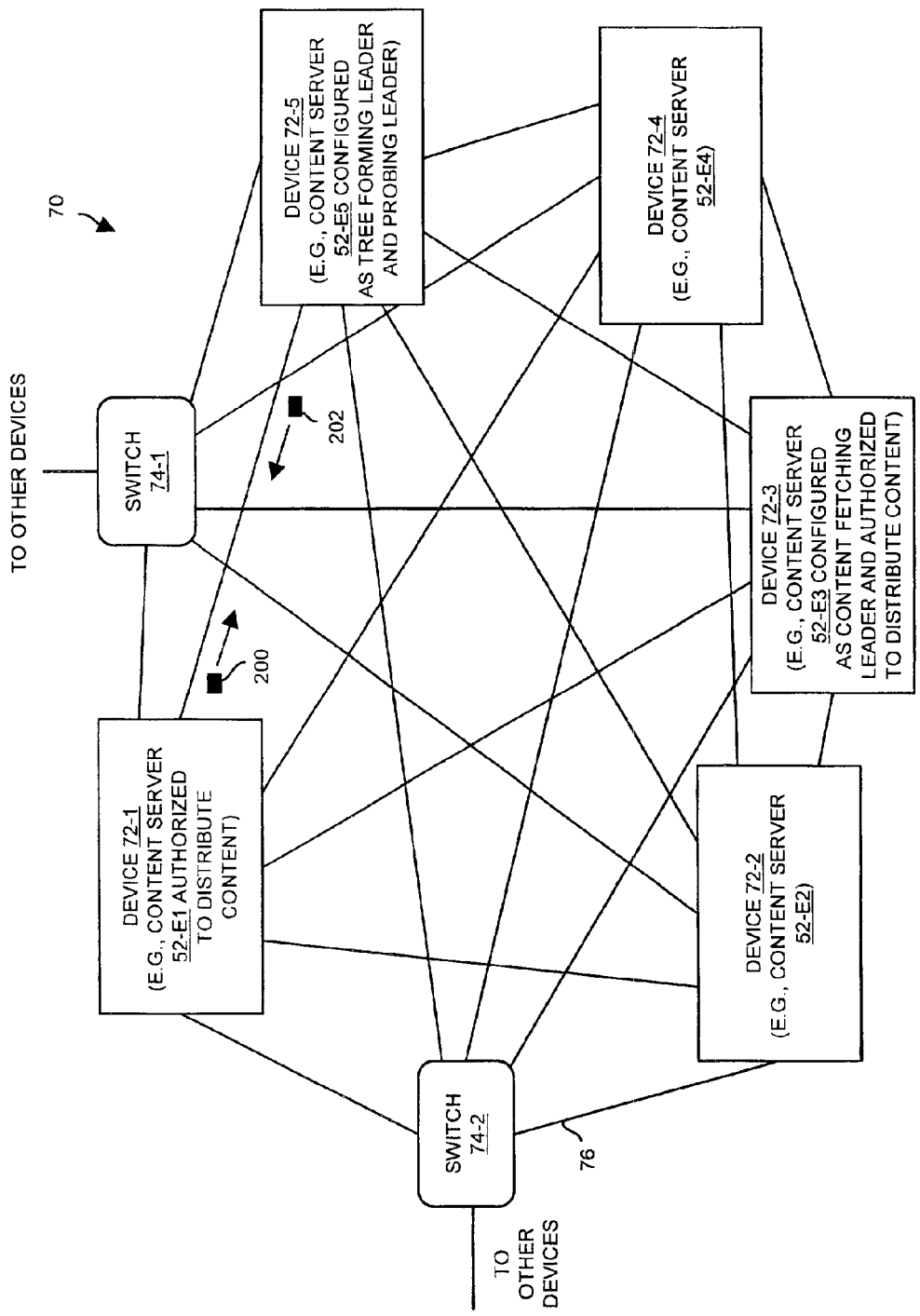
FIG. 16 is a block diagram of the set of devices of FIG. 5 including communications between an authorized content serving device and a device configured to operate as a tree forming leader and a probing leader.

FIG. 16 shows the content server 52-E1 sending a tree information request message 200 to the content server 52-E5 requesting the tree information. The content server 52-E1 and other content servers 52 send such requests to their local tree forming leaders when ready to determine device-paths for fetching content. As shown in FIG. 16, the content server 52-E5, in its capacity as a tree forming leader, responds to the tree information request message 200 from the content server 52-E1 by providing a tree information response message 202 containing tree information, i.e., a location-path identifying a path of locations 60 leading from the content server 52-E1 to the content-originating device 64. For example, the content server 52-E5 can provide a data structure (i) identifying the structure of a particular tree (see the data structure field 186 in FIG. 14) or (ii) simply listing the locations 60 in order from the content server 52-E1 to the content-originating device 64.

As will be discussed in further detail later, in the case of pre-positioned content, the content server 52-E1 can then communicate with the probing leader to select a device-path from multiple possible device-paths through the location-path. After selection of the device-path, the content server 52-E1 is ready to obtain and serve content on behalf of the host domain. If the content server 52 is a content fetching leader for a particular host domain, the content server 52 obtains the content from another location 60. If the content server 52 is not the content fetching leader, the content server 52 obtains the content from the content fetching leader at the same location 60.

FIG. 17 shows a set 210 of parameters which are suitable for configuring a computerized device 120 as the content fetching leader for fetching content at location 60-E on behalf of the host domain "www.hd-1.com". As shown in FIG. 17, the tree forming leader and probing leader variables 156, 160 are set to "NO", and the content fetching leader variable 158 is set to "YES—www.hd-1.com", thus configuring the computerized device 120 to operate as a content fetching leader for the host domain "www.hd-1.com" but not a tree forming leader or a probing leader. Similar sets 210 of parameters can be used to configure other computerized devices to operate as content fetching leaders for other host domains.

Figure 18:
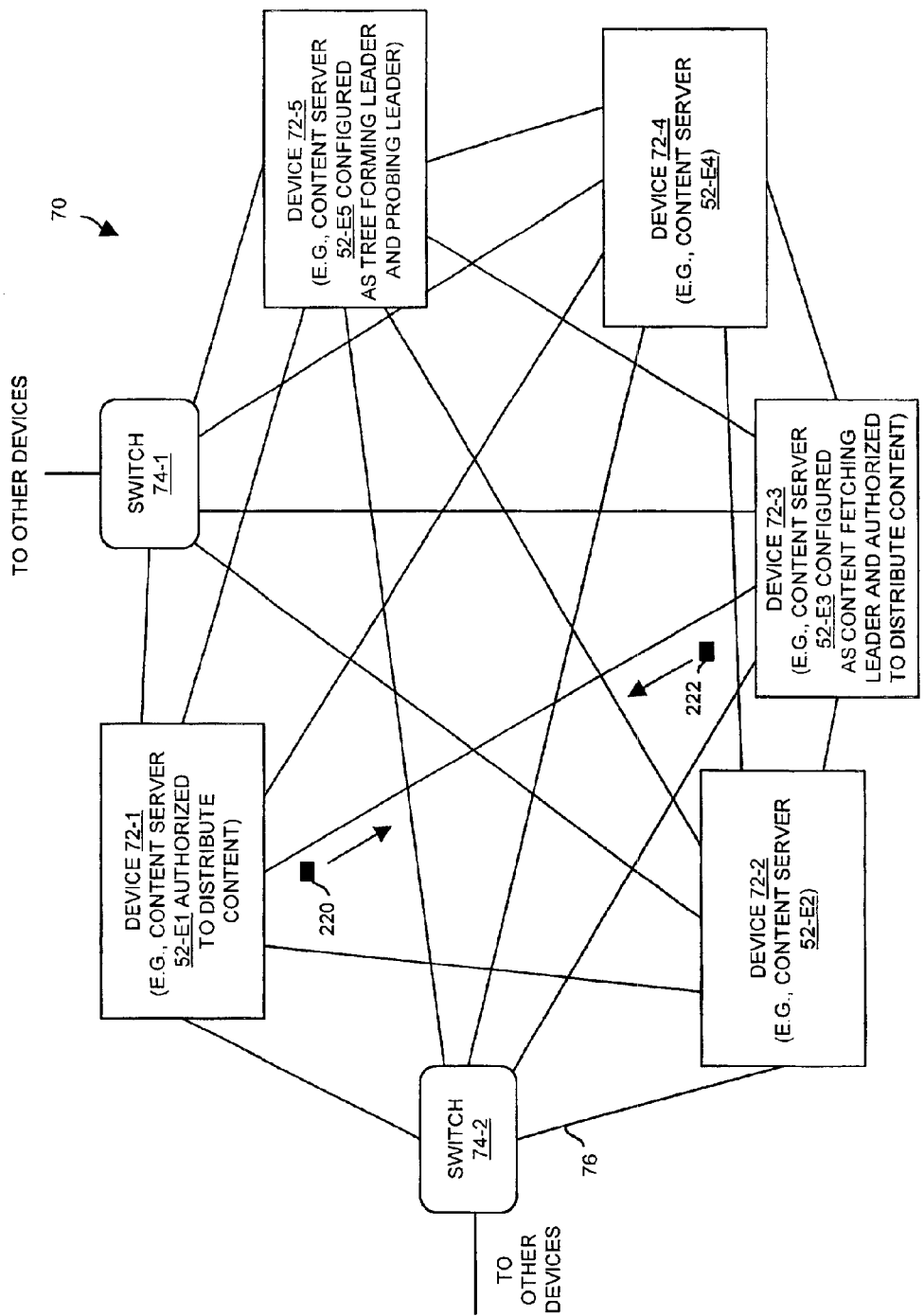
FIG. 18 is a block diagram of the set of devices of FIG. 5 including communications between the authorized content serving device and a device configured to operate as a content fetching leader.

FIG. 18 shows the content server 52-E1 sending a content request message 220 to the content server 52-E3 requesting content for the host domain "www.hd-1.com". It is likely that the content server 52-E3 had buffered this content since it is also an authorized content server 52 which obtains and serves content on behalf of the host domain "www.hd-1.com" (see the authorized host domain field 161 of the set 210 of parameters of FIG. 17). Accordingly, the content server 52-E3, in its capacity as a content fetching leader, responds to the request message 220 by providing a content response message 222 containing the requested content. The unlikely situation in which the content server 52-E3 does not yet have the content is explained later.

Device-Path Formation

As mentioned earlier, the virtual content-distribution trees provide a general structure for content distribution but do not indicate the pathways through particular content servers. That is, the virtual trees dictate particular locations 60 for content distribution, but do not dictate particular content servers 52 within the locations 60 for content distribution. In order to determine the content pathways at the device-path level, the content servers 52 form ordered lists of content servers 52 based on the location-paths identified by the virtual trees, and then select particular device-paths from multiple possible device-paths based on the formed ordered list.

FIG. 19 shows a table 230 of host domain assignments. Each computerized device which operates as a content server 52 maintains such a table 230. The table 230 includes a series of entries 232. Each entry 232 includes a host domain field 234, a list 236 of prioritized authorized servers and a tree field 238. For each entry 232, the contents of the host domain field 234 identify a particular host domain, the contents of the list 236 of prioritized authorized servers includes an order of content servers 52 at the location 60 of the computerized device which are authorized to obtain and serve content for that particular host domain, and the contents of the tree field 238 includes a number identifying the virtual content-distribution tree for that particular host domain.

In one arrangement, the size of the table 230 is limited in order to conserve memory space, and the entries 232 can change in a manner similar to that of a cache. That is, the computerized device 120 can search the table 230 for a particular entry 232, and if it cannot find certain information, the computerized device 120 can communicate with the tree forming leader at the current location 60 to obtain that information and then store the information in the table 230 (e.g., by overwriting an older entry 232). In this manner, the computerized device 120 stores and obtains new information about the content distribution system 50. By way of example only, the table 230 includes local information to the location 60-E and is an example of what may reside in a computerized device 120 operating as the content server 52-E1.

FIG. 20 show another table 240 of host domain assignments. As shown, the table 240 includes entries 232 containing information about locations (e.g., the location 60-C) other than the current location 60-E. Accordingly, the table 240 is an example of what may reside in a computerized device 120 operating as the content server 52-E3, which is also the content fetching leader of the location 60-E for a particular hosted domain, since the content server 52-E3 can frequently require knowledge of other locations 60 (e.g., the location 60-C) as well as knowledge of its own location 60-A. As explained earlier, the depths of the location-paths do not need to be very large (e.g., roughly four levels deep for 1000 nodes where each parent has 10 children). Accordingly, when the locations-paths are generally fairly short, the table 230 does not need to be very large. Further details of how the content servers 52 form device-paths will now be provided with reference to FIGS. 21 through 25.

Figure 21:
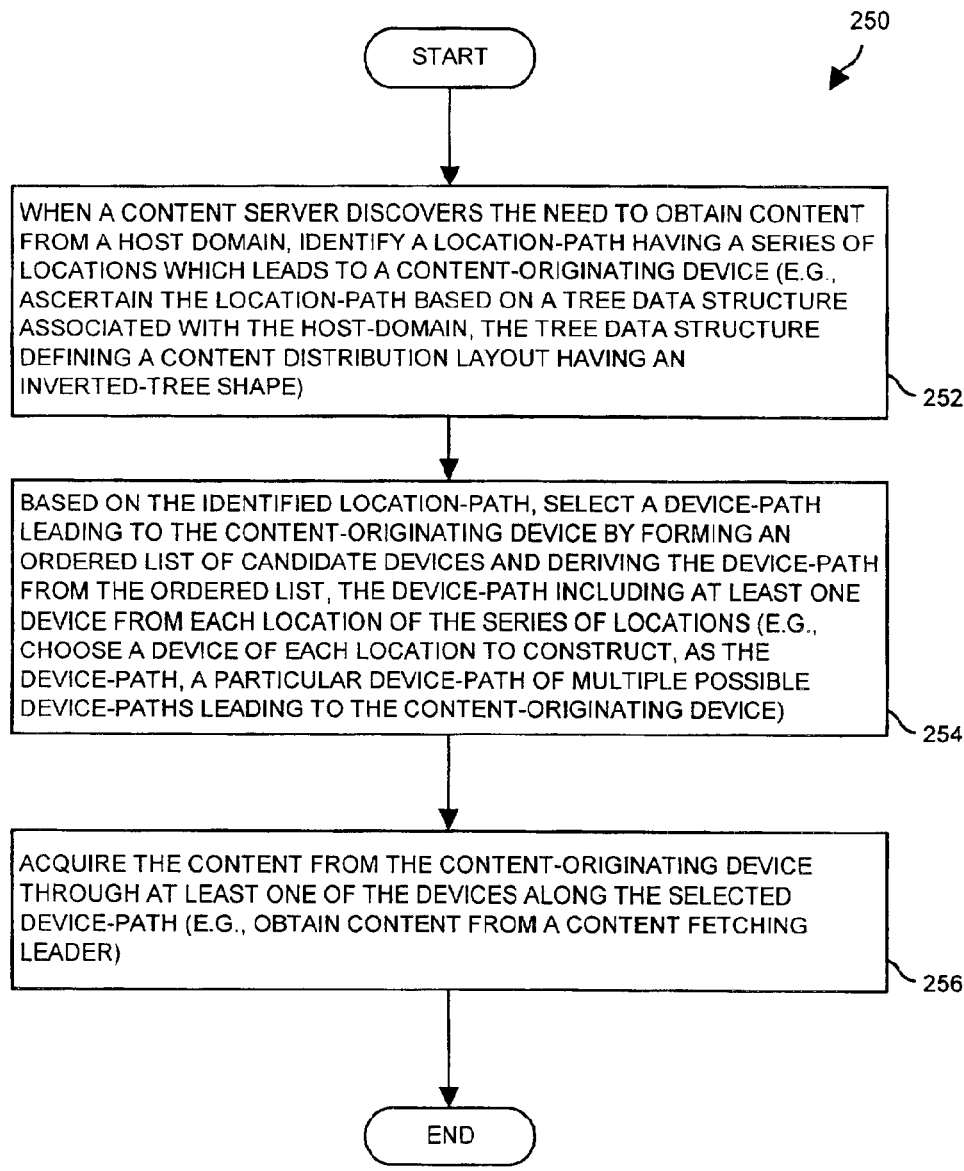
FIG. 21 is a flowchart of a procedure for acquiring content through a selected device-path which is based on a location-path.

FIG. 21 is a flowchart of a procedure 250 which is performed by a content server 52 at a location 60 (i.e., a current location 60 of that content server 52) in order to obtain and serve content based on a location-path. In step 252, when the content server 52 discovers a need to obtain content from a host domain (e.g., receives a request for live content, receives an internally and periodically generated reminder to obtained content for pre-positioning, etc.), the content server 52 identifies a location-path. The identified location-path includes a series of locations which leads to a content-originating device. In one arrangement, the tree information request message 200 identifies a host domain. In response to the tree information request message, the tree forming leader accesses its table 230 (FIG. 19) to determine the virtual tree for the identified host domain (e.g., virtual tree #23 for the host domain "www.hd-1.com"), and then accesses its table 180 in order to obtain structure information regarding the virtual tree. Based on this structure information, the tree forming leader returns the tree information response message 202 containing the location-path leading from the current location 60 to the content-originating device. Such information can be cached and then used by the content server 52 to form the location path without sending the tree information request message 200.

In step 254, to the content server 52 selects a device-path leading to the content-originating device based on the identified location-path. The selected device-path includes at least one device from each location 60 of the series of locations leading from the content server 52 to the content-originating device. Accordingly, the selected device-path is one of multiple possible device-paths leading to the content-originating device. To select the device-path, the content server 52 forms an ordered list of candidate devices (i.e., content servers 52 which are capable of providing the content) and derives the device-path from the ordered list. The way in which the content server 52 forms the ordered list of candidate devices and derives the device-path from the ordered list is flexible. In one arrangement, the content server 52 forms the ordered list and derives the device-path based on the ordered list in one of multiple ways depending on the type of content to be fetched (e.g., pre-positioned content, live content, etc.). These features of the invention will be further explained shortly.

In step 256, the content server 52 acquires the content from the content-originating device through at least one of the devices along the selected device-path. The manner in which the content server 52 acquires the content can be dictated by the type of content being fetched. For example, some content fetching protocols require identification of a complete device-path leading from the content server 52 to the content-originating device. Some products provided by RealNetworks, Inc. of Seattle, Wash. use such a protocol. As another example, some content fetching protocols only require knowledge of the closest device from which content is to be fetched. For these protocols, the content server 52 can simply send a content request to that device. In particular, if the content server 52 is not a content fetching leader, the content server 52 can send the content request to the content fetching leader at the current location 60 in order to obtain the content Alternatively, if the content server 52 is a content fetching leader (i.e., the device configured to fetch content for a particular host domain on behalf of all of the content servers 52 of the current location 60), the content server 52 can send the content request to a device at another location 60 (i.e., a device at the parent node location 60 in the virtual tree) in order to obtain the content. Further details of steps 254 and 256 will now be provided with reference to FIGS. 22 through 25.

Live Content

Live content such as a video stream and/or an audio stream flows from the content-originating device in real time. By offloading the content providing work from the content-originating device to other content servers nearer requesting devices in the content distribution system 50 (FIG. 4), the requesting devices will experience less network congestion and smoother content delivery.

Figure 22:
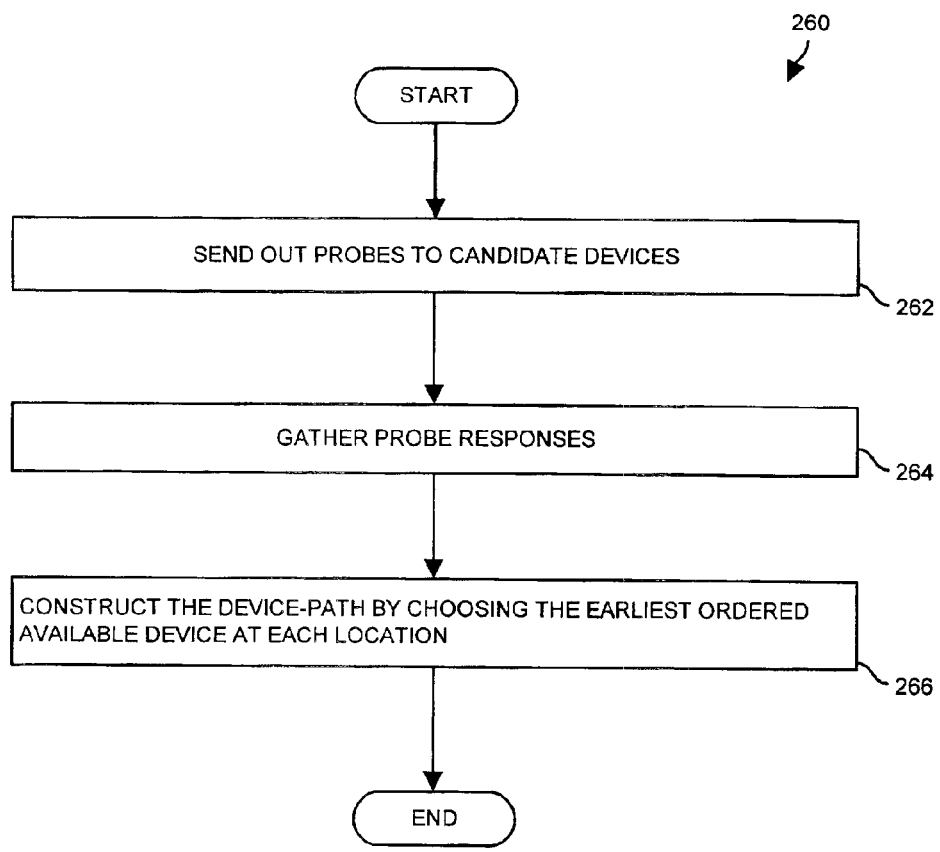
FIG. 22 is a flowchart of a procedure for selecting the device-path in accordance with a first approach.

FIG. 22 shows a procedure 260 which is performed by a content server 52 at a particular location 60 when selecting a device-path for live content (also see step 254 of the procedure 250 of FIG. 21) from a particular host domain. In step 262, the content server 52 identifies candidate devices which are authorized to serve content for the particular host domain, and forms an ordered list of candidate devices (i.e., other content servers 52 in the content distribution system 50). In one arrangement, the candidate devices are arranged in a computed or hashed order (e.g., a result of a rule-based procedure). Recall (i) that the tree forming leader had previously provided the content server 52 with a location-path (step 252 of FIG. 21), and (ii) that the content server 52 can obtain a list of authorized content servers at each location on the location-path by accessing its table 240 containing prioritized authorized content servers 52 or by communicating with other content servers 52 to obtain the prioritized authorized content server 52 (e.g., by communicating with the tree forming leader at the current location 60). In one arrangement, the content server 52 forms the ordered list of candidate devices by choosing the first two identified candidate devices at each location 60 of the location-path. Next, the content server 52 sends out probes to the candidate devices directly. In one arrangement, the content server 52 performs lightweight probes (e.g., "pings" the candidate device).

In step 264, the content server 52 gathers responses to the sent out probes. The content server 52 assumes that any candidate devices which do not respond within a predetermined amount of time have failed or are incapable of providing the content in a timely manner (e.g., due to network congestion).

In step 266, the content server 52 constructs a device-path by choosing the earliest ordered device at each location 60 which responded within the predetermined amount of time. If there are no responding devices at a particular location 60, the device-path simply skips over that location 60 (e.g., under the assumption that there is problem with the entire location 60). The content server 52 can then obtain the live content through the constructed device-path.

The procedure 260 provides a fault tolerance mechanism (i.e., does not include any failed devices in the device-path) alleviating the need for each content server 52 at each location to continuously probe other content servers 52 in the CDN as in the earlier described conventional CDN 20 of FIG. 1. That is, fault tolerance is provided during path formation rather than during virtual tree maintenance thus alleviating the need for constant probing between content servers 52. As a result, probing can occur on a less frequent basis and network traffic is substantially lower in the content distribution system 50.

It should be understood that the probes performed by the content server 52 when providing live content are different than the earlier-described probes performed for tree formation and maintenance. The live content probes are performed directly by the content servers 52 which need the live content, and thus provide fault tolerance and only occur in response to-requests for live content. In contrast, the tree formation and maintenance probes are periodically performed by probing leaders for tree formation and maintenance. For both of these types of probes, the consumed network bandwidth (i.e., the created network traffic) is substantially less than that of conventional content distribution systems which require frequent and extensive probing (e.g., see FIGS. 1 through 3). Further details of the device-path forming procedure 260 will now be provided with reference to FIG. 23.

Figure 23:
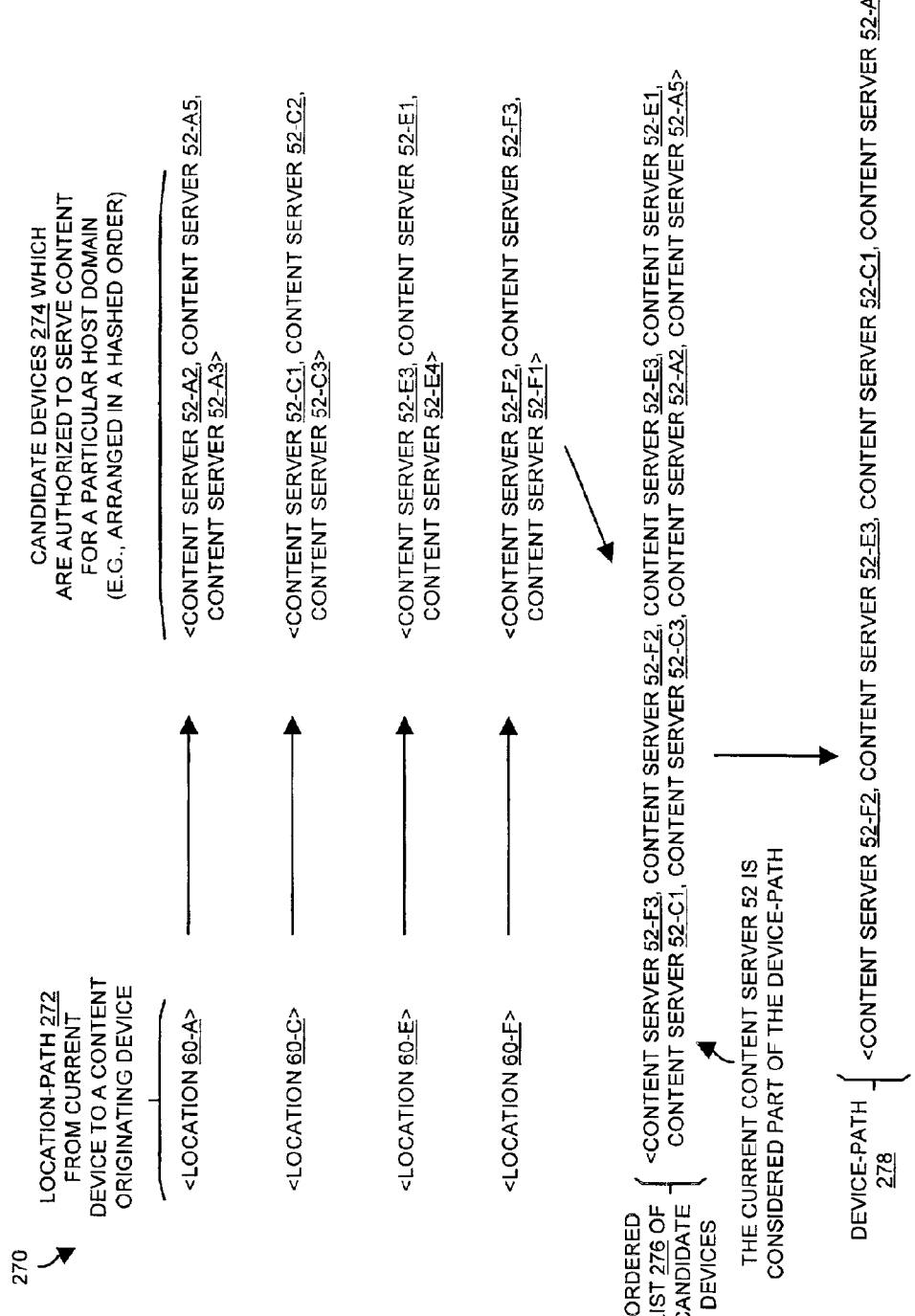
FIG. 23 is an information flow diagram showing, by way of example, formation of an ordered list of candidate devices when determining a device-path in accordance with the first approach.

FIG. 23 shows an example 270 of the device-path forming process from the perspective of the content server 52-F3 of FIG. 6 when attempting to obtain live content from the content-originating device 64. Initially, the content server 52-F3 includes a cached location-path 272 (also see step 252 of FIG. 21) which was obtained from the tree forming leader. The location-path 272 is based on the structure of tree #23 (see table 230 of FIG. 19 and table 180 of FIG. 14) and includes locations 60-F, 60-E, 60-C and 60-A which lead from the content server 52-F3 to the content-originating device 64.

Next, the content server 52-F3 identifies all (or a subset) of the candidate devices 274 which are authorized to serve content at the locations 60-G, 60-E, 60-C and 60-A listed in the location-path 272. For such identification, the content server 52-F3 can rely on its knowledge of authorized content servers in its local table (see the example tables 230 and 240 in FIGS. 19 and 20), as well as communicate with other content servers 52 (e.g., the tree forming leader at the location 60-F which is the content server 52-F1) if lacking the needed information. Accordingly, and as shown in FIG. 23, the content server 52-F3 identifies content servers 52-F2, 52-F3 and 52-F1 as prioritized authorized content servers in location 60-F, content servers 52-E3, 52-E1 and 52-E4 as prioritized authorized content servers in location 60-E, and so on.

Then, the content server 52-F3 forms an ordered list 276 of candidate devices 274 by choosing the first two listed devices at each location 60 along the location-path. As shown in FIG. 23, the content server 52-F3 includes, in the ordered list 276, the first two candidate devices from the location 60-F (i.e., the content servers 52-F2, 52-F3), followed by the first two candidate devices from the location 60-E (i.e., the content servers 52-E3, 52-E1), and so on. (Only the content server 52-F2 is added to the ordered list 276 from the candidate devices for location 60-F since it is the content fetching device, and then the current content server 52-F3 is pre-pended to the ordered list for completeness).

The content server 52-F3 then probes the candidate devices directly.(e.g., sends pings to the candidate devices. The content server 52-F3 then collects responses from the candidate devices during a predetermined amount of time (i.e., a predetermined time threshold).

Subsequently, the content server 52-F3 constructs a device-path 278 based on the ordered list and the probe responses. In particular, for each location 60, the content server 52-F3 picks the first content server 52 at that location 60 if that content server 52 replied within the predetermined amount of time. If the first content server 52 at any location 60 did not reply within the predetermined amount of time (e.g., due to failure or network congestion), the content server 52-F3 picks the second content server 52 at that location 60. If neither the first or second content server replied at a particular location 60, the content server 52-F3 does not include any content servers 52 at that location 60 in the device-path (i.e., the content server 52-F3 skips over that location 60). For example, suppose that each of the probed content servers 52 responded within the predetermined amount of time. In this situation, the device-path 278 includes the first content server 52 at each location 60 of the ordered list 276, namely content servers 52-F2, 52-E3, 52-C1 and 52-A2, as shown in FIG. 23.

Finally, the content server 52-F3 obtains the live content from the content-originating device 64 through the device-path 278. That is, the content server 52-F3 fetches the live content through the series of content servers 52 identified in the device-path 278, and then serves that live content to any requesting devices 66 requesting that live content (e.g., the requesting device 662).

It should be understood that there is a built-in fault tolerance feature in the above-described approach to obtaining live content. Suppose that the content server 52-E3 did not respond within the predetermined amount of time, but that all of the other probed content servers 52 did respond within the predetermined amount of time. In this situation, the content server 52-F3 does not include the content server 52-E3 in the device-path 278. Rather, the content server 52-F3 includes the content server 52-E1 in the device-path 278 since the content server 52-E1 responded within the predetermined amount of time. Accordingly, the content server 52-F3 circumvents the non-responding content server 52-E3 and obtains the live content through the content server 52-E1. Since the content server 52-F3 is still able to acquire the live content, the content server 52-F3 can still serve the content in a smooth and timely manner. Furthermore, since fault tolerance is provided at the time of path formation, there is no need for the content server 52-F3 to continuously communicate with all of the other content servers 52 of the content distribution system 50 (e.g., every few seconds) as is typically performed by the conventional content servers 22 of the conventional CDN 20 (also see FIG. 1) thus minimizing the network traffic and overhead burden in the content distribution system 50.

It should be further understood that the device-path may skip locations 60 in some instances. For example, in the above-described scenario, suppose that the content servers 52-E3 and 52-E1 did not respond within the predetermined amount of time, but that all of the other probed content servers 52 did respond within the predetermined amount of time. In this situation, the content server 52-F3 does not include the content server 52-E3 and 52-E1 in the device-path 278. Rather, the content server 52-F3 skips over any content servers 52 in the location 60-E and simply allows the device-path to extend from location 60-F to 60-C. Accordingly, the content server 52-F3 circumvents all of the content servers at the non-responding location 60-E altogether thus providing another level of fault tolerance, i.e., the problematic location 60-E is avoided completely. This approach is a very acceptable way of obtaining the live content since, if two content servers 52 at a location 60 do not reply to a probe within the predetermined amount of time, it is highly probable that any other content servers 52 at that location 60 are unavailable as well (e.g., due to a power failure, due to a network problem or severe network traffic, etc.).

It should be understood that the operation described above involves probing two devices at each location by way of example only. In other arrangements, a different number of devices are probed (e.g., one, three, four, etc.).

Pre-Positioned Content

Pre-positioned content such as a large standard file, a large game, other large program executables, presentations, and video on demand (VOD) flows from the content-originating device from time to time (e.g., on a periodic or scheduled basis). Such offloading content server operations from the content-originating device onto other content servers nearer requesting devices in the content distribution system 50 (FIG. 4) results in the requesting devices experiencing less network congestion and smoother content delivery. This enables the host domain to achieve various streaming guarantees and prevents end users from encountering substantial delays before accessing such content.

Figure 24:
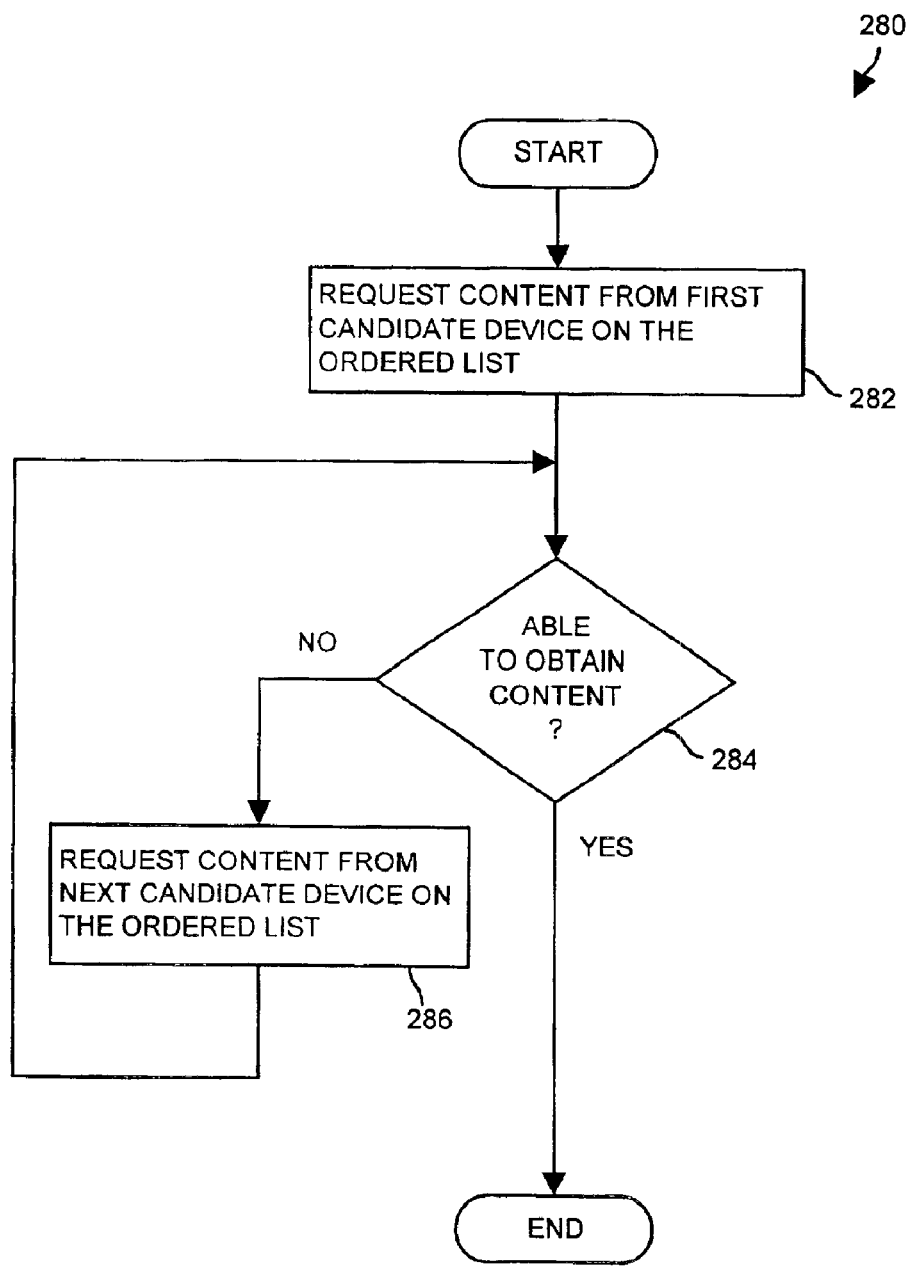
FIG. 24 is a flowchart of a procedure for selecting the device-path in accordance with a second approach.

FIG. 24 shows a procedure 280 which is performed by a content server 52 at a particular location 60 when selecting a device-path for pre-positioned content (also see step 254 of the procedure 250 of FIG. 21) from a particular host domain.

The content server 52 constructs an ordered list of candidate devices in a manner similar to that described above in connection with live content (also see FIG. 23). In particular, the content server 52 identifies candidate devices which are authorized to serve content for the particular host domain, and forms an ordered list of candidate devices (i.e., other content servers 52 in the content distribution system 50). If knowledge of the candidate devices is not already cached, the content server 52 can make such identifications by obtaining a location-path from the tree forming leader at the same location 60, and obtaining a list of content servers 52 at each location 60 of the location-path (i.e., by accessing its table 240 containing prioritized authorized content servers 52 or by communicating with other content servers 52). In one arrangement, the content server 52 forms the ordered list of candidate devices by choosing all of the identified candidate devices at each location 60 of the location-path.

Next, the content server 52 attempts to obtain the pre-positioned content from the first content server 52 on the ordered list (step 282). If the attempt is successful (step 284), the content server 52 is then ready to serve the pre-positioned content to requesting devices 66. However, if the attempt is unsuccessful (e.g., a timeout clock expires), the content server 52 then attempts to obtain the pre-positioned content from the next content server 52 on the ordered list (step 286), and so on, until the content server 52 obtains the content.

It should be understood that the selection of the actual device-path of the pre-positioned content is essentially made at the same time the content server 52 obtains the pre-positioned content. That is, when the fetching content server 52 receives the pre-positioned content from the providing content server 52, the ultimate path of the content is the earlier path that the pre-positioned content took to reach the providing content server 52 plus the remaining path from the providing content server 52 to the fetching content server 52. This aspect of the invention will be better understood with the following example which references FIG. 25.

FIG. 25 shows an example 290 of the device-path forming process from the perspective of the content server 52-F3 of FIG. 6 when attempting to obtain pre-positioned content from the content-originating device 64. Initially, the content server 52-F3 obtains a location-path 292 (also see step 252 of FIG. 21) from the tree forming leader at the location 60-F (e.g., the content server 52-F1). The location-path 292 is based on the structure of tree #23 (see table 230 of FIG. 19 and table 180 of FIG. 14) and includes locations 60-F, 60-E, 60-C and 60-A which lead from the content server 52-F3 to the content-originating device 64.

Next, the content server 52-F3 identifies all (or a subset) of the candidate devices 294 which are authorized to serve content at the locations 60-G, 60-E, 60-C and 60-A listed in the location-path 292. For such identification, the content server 52-F3 can rely on its knowledge of authorized content servers in its local table (see the example tables 230 and 240 in FIGS. 19 and 20), as well as communicate with other content servers 52 (e.g., the tree forming leader at the location 60-F (e.g., the content server 52-F1). Accordingly, and as shown in FIG. 25, the content server 52-F3 identifies content servers 52-F2, 52-F3 and 52-F1 as prioritized authorized content servers in location 60-F, content servers 52-E3, 52-E1 and 52-E4 as prioritized authorized content servers in location 60-E, and so on.

Then, the content server 52-F3 forms an ordered list 296 of candidate devices 274 by choosing all of the listed devices along the location-path 292.

Next, the content server 52 attempts to obtain the pre-positioned content from the first content server 52-F2 on the ordered list 296. If the attempt is successful, the content server 52-F3 is then ready to serve the pre-positioned content to requesting devices 66 (e.g., the requesting device 66-2). On the other hand, if the attempt is unsuccessful (e.g., a timeout clock expires), the content server 52-F3 then attempts to obtain the pre-positioned content from the next content server 52-E3 on the ordered list, and so on, until the content server 52 obtains the content.

The ultimate device-path 298 for the pre-positioned content is the path 300 between the content server 52-F3 and the content server 52 that directly provided the pre-positioned content to the content server 52-F3 (e.g., the content server 52-E3) plus the path 302 that the pre-positioned content took to reach the content server 52 that directly provided the pre-positioned content to the content server 52-F3 (e.g., the path through the content servers 52-E3, 52-C1 and 52-A2).

It should be understood that there is a built-in fault tolerance feature in the above-described approach to obtaining pre-positioned content. In particular, if the content server 52-F3 is unsuccessful in obtaining the pre-positioned content from a particular content server 52, the content server 52-F3 reattempts to obtain the pre-positioned content from the next content server 52 on the ordered list. Accordingly, the content server 52-F3 circumvents any content server 52 that is unsuccessful at providing the pre-positioned content. As a result, fault tolerance is provided at the time of path formation. Thus, there is no need for the content server 52-F3 to continuously communicate with all of the other content servers 52 of the content distribution system 50 as is typically performed by the conventional content servers 22 of the conventional CDN 20 (also see FIG. 1) thus minimizing the network traffic and overhead burden in the content distribution system 50.

CONCLUSION

Embodiments of the invention are directed to techniques for obtaining content from content-originating devices (e.g., a home site for a host domain) using virtual content-distribution trees in which the nodes of the virtual trees refer to sets or groups of devices (i.e., one or more content servers) rather than individual devices (i.e., individual content servers). The use of such "virtual trees" can greatly reduce tree size and the number of trees thus leading to a reduction in overhead, as well as the resulting network congestion, for tree maintenance and management Accordingly, the content distribution system 50 of the invention provides less overhead, better scalability and less traffic than conventional CDNs (e.g., the conventional CDN 20 of FIGS. 1 through 3). Moreover, the reduction in network traffic improves the scalability of the content distribution system 50, and allows the content distribution system 50 to easily meet various content streaming guarantees. The features of the invention, as described above, may be employed in systems, devices and methods, as well as other electronic components such as those of Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the connecting media 24 was shown as having a point-to-point topology by way of example only. Other topologies and combinations of other topologies are suitable for use as well (e.g., backbone, hub-spoke, star, etc.).

Additionally, it should be understood that the data communications devices 26 were described above as being switches 74 (see FIG. 5) by way of example only. Other types of data communications devices and combinations thereof can be used as well (e.g., routers, bridges, etc.).

Furthermore, it should be understood that particular modifications can be made to the above-described procedures for obtaining content. For example, it was described above that the first two candidate content servers 52 at each location 60 are chosen when forming the ordered list. In other arrangements, a different number of candidate content servers 52 are chosen (e.g., one, three, four, etc.). For optimization purposes, the number used should reflect the reliability of the content distribution system 50. For example, if it is extremely unlikely that five content servers 52 at a location 60 will fail but that the sixth content server 52 will be available, it does not provide a great benefit to chose five content servers 52 from each location 60 for the ordered list.

Additionally, it should be understood that the content distribution system 50 was shown as including 27 content servers 52 by way of example only. In other arrangements, the content distribution system 50 includes a different number of content servers 52 (e.g., hundreds or thousands of content servers 52 which are geographically distributed across the Internet, and hundreds or thousands of locations 60).

Furthermore, it should be understood that the content was described above as passing only through content servers 52 which are authorized to serve content by way of example only. This prevents overburdening non-authorized content servers 52 with the task of storing content on behalf of host domains which those content servers 52 do not serve. In other arrangements, non-authorized content servers 52 can temporarily buffer content as it flows through the content distribution system 50 (i.e., "caching servers"). This provides flexibility and, in some situations, more efficient content distribution paths since the possession of the content is not restricted only to authorized content servers 52.

Additionally, it should be understood that the virtual trees were described as including only locations 60 which have authorized content servers 52 (i.e., which have homogenous paths that consist entirely of content servers 52 authorized to serve a particular host domain). In other arrangements, the virtual trees can include locations 60 which do not have any authorized content servers 52 (i.e., heterogeneous paths). Such an arrangement is suitable for distributing content through non-authorized content servers 52 (e.g., when the non-authorized "caching servers" buffer, at least temporarily, content on behalf of non-authorized host domains).

Furthermore, it should be understood that the locations 60 were described as including content servers 52 which are close to each other from a network distance/congestion perspective. In other arrangements, the locations 60 are established using other criteria (e.g., by POP or colo, by location relative to firewalls, etc.). In some arrangements, exactly what constitutes a location 60 is up to the operator/user of the content distribution system 50 (i.e., a user of the content distribution manager 62).

Additionally, it should be understood that the content servers 52 were described as being configured by the content distribution manager 62 by way of example only. In other arrangements, the content servers 52 are configured by other means, e.g., manually at each content server 52, from another remote location through the network, etc.

Furthermore, in a manner similar to that described above which prioritizes authorized content servers 52, the content servers 52 can include prioritizations for leader backups. For example, each content server 52 which is authorized to operate as a tree forming leader can have a backup which steps in if that content server 52 should fail. Accordingly, if the leader of some location 60 fails, a backup will take over both for communication with servers in other locations 60, but also for communication within its location 60.

Additionally, it should be understood that above-provided description explained that the leaders obtained information for non-leaders by communicating with the content distribution manager 62 or other leaders at other locations 60. In other arrangements, other types of communications are allowed. Such alternatives include leaders getting information directly from a central management site, non-leaders getting information by communicating with leaders at other locations 60, etc.

Furthermore, it should be understood that there can be leaders for operations other than tree forming, probing and content fetching. Such other operations include refreshing tables, device-path formation, etc.

Additionally, it should be understood that the leaders were described above as generally sending back information only for their particular locations 60. In other arrangements, the leaders are capable of sending back not only information about their own locations 60, but stored information that they may have for other locations 60 as well (e.g., stored information for every location 60 along a location-path). In such arrangements, the leaders do not need to communicate with leaders beyond its parents. As a result, there are less communications although the communications are somewhat larger.

Furthermore, it should be understood that the explanation above described a tree that is dynamically formed and maintained by way of example only. In other arrangements, the tree is a static tree and thus does not require probing leaders and probing for tree formation and maintenance. In these other arrangements, the only probes are for fault tolerance when serving live content, and such probes can result in minimal network traffic. Such enhancements and modifications are intended to be included as embodiments of the invention.

What is claimed is:

1. In a computerized device, a method for obtaining content from a content-originating device, the method comprising the steps of:

identifying a location-path having a series of locations which leads from the computerized device to the content-originating device, wherein each location includes a set of devices, and wherein the set of devices of at least one location includes multiple devices;

selecting a device-path from the computerized device to the content-originating device based on the identified location-path, wherein the selected device-path includes at least one device of each location of the series of locations; and acquiring the content from the content-originating device from at least one of the devices along the selected device-path; wherein the step of selecting the device-path includes the steps of:

forming an ordered list of devices, wherein each device of the ordered list belongs to the series of locations which leads from the computerized device to the content-originating device; and deriving the device-path based on the formed ordered list of devices.

2. The method of claim 1 wherein a location of the series of locations which leads from the computerized device to the content-originating device includes a set of devices that includes the computerized device and a content fetching leader device, wherein the selected device-path includes the content fetching leader device, and wherein the step of acquiring the content includes the steps of:

sending a content request message from the computerized device to the content fetching leader device; and receiving, in response to the content request message, the content from the content fetching leader device.

3. The method of claim 1 wherein the content is a live feed, and wherein the step of deriving the device-path includes the steps of:

probing each device on the formed ordered list for responses; and constructing the device-path based on the responses.

4. The method of claim 1 wherein the content is pre-positioned material, and wherein the step of deriving the device-path includes the steps of:

requesting the content from a first device in the formed ordered list; and re-requesting the content from another device in the formed ordered list if the computerized device does not receive the content from the first device in the formed ordered list.

5. The method of claim 1 wherein the computerized device resides within a content distribution network; wherein the step of identifying the location-path having the series of locations includes the step of:

reading an entry of a table having multiple entries, the multiple entries of the table including (i) domain fields having values that identify content-originating devices, (ii) server fields having sets of values identifying content servers which are configured to serve content for those content-originating devices, and (iii) tree number fields having values which identify inverted tree structures representing location-paths for distributing content from those content-originating devices through locations of the content distribution network, to enable multiple computerized devices to efficiently store common content distribution information, and picking the location-path having the series of locations based on the read entry;

wherein the read entry includes a domain field having a value identifying the content-originating device among other content-originating devices, a server field having a set of values that identifies content servers which are configured to serve content for the content-originating device, and a tree number field having a value which identifies a tree structure representing location-paths for distributing the content from the content-originating device through locations of the content distribution network; and wherein the selected device-path includes exactly one device from each location along the identified location-path.

6. The method of claim 5 wherein the read entry has, as the set of values that identifies the content servers which are configured to serve content for the content-originating device, an ordered series of values; and wherein a first value in the ordered series of values identifies a first content server having priority to serve the content, followed by a second value in the ordered series of values identifying a second content server for serving the content when the first content server fails.

7. In a computerized device, a method for obtaining content from a content-originating device, the method comprising the steps of:

identifying a location-path having a series of locations which leads from the computerized device to the content-originating device, wherein each location includes a set of devices, and wherein the set of devices of at least one location includes multiple devices;

selecting a device-path from the computerized device to the content-originating device based on the identified location-path, wherein the selected device-path includes at least one device of each location of the series of locations; and acquiring the content from the content-originating device from at least one of the devices along the selected device-path;

wherein the content-originating device is configured to operate as a content server for a first host domain; wherein a tree data structure, which defines a content distribution layout having an inverted-tree shape, is associated with a second host domain for distribution of content from the second host domain; and wherein the step of identifying the location-path includes the steps of:

associating the tree data structure, which defines the content distribution layout having the inverted-tree shape, with the first host domain; and ascertaining the location-path having the series of locations which leads from the computerized device to the content-originating device based on the tree data structure.

8. The method of claim 7 wherein the set of devices of each location along the series of locations which leads from the computerized device to the content-originating device provides multiple possible device-paths from the computerized device to the content-originating device, and wherein the step of selecting the device-path includes the step of:

choosing a device of each location to construct, as the device-path, a particular one of the multiple possible device-paths from the computerized device to the content-originating device.

9. In a computerized device, a method for obtaining content from a content-originating device, the method comprising the steps of:

identifying a location-path having a series of locations which leads from the computerized device to the content-originating device, wherein each location includes a set of devices, and wherein the set of devices of at least one location includes multiple devices;

selecting a device-path from the computerized device to the content-originating device based on the identified location-path, wherein the selected device-path includes at least one device of each location of the series of locations; and acquiring the content from the content-originating device from at least one of the devices along the selected device-path;

wherein a location of the series of locations which leads from the computerized device to the content-originating device includes a set of devices that includes the computerized device and a tree former leader device, and wherein the step of identifying the location-path includes the steps of:

sending a location-path request message from the computerized device to the tree former leader device; and receiving, from the tree former leader device, a reply message which defines the location-path having the series of locations which leads from the computerized device to the content-originating device.

10. A computerized device for obtaining content from a content-originating device, comprising:

a network interface; and a controller coupled to the network interface, the controller being configured to:
  (i) identify a location-path having a series of locations which leads from the computerized device to the content-originating device, wherein each location includes a set of devices, and wherein the set of devices of at least one location includes multiple devices,
  (ii) select a device-path from the computerized device to the content-originating device based on the identified location-path, wherein the selected device-path includes at least one device of each location of the series of locations, and
  (iii) acquire the content from the content-originating device from at least one of the devices along the selected device-path through the network interface;

wherein the controller, in order to select device-path, is configured to:
  form an ordered list of devices, wherein each device of the ordered list belongs to the series of locations which leads from the computerized device to the content-originating device; and
  derive the device-path from the formed ordered list of devices.

11. The computerized device of claim 10 wherein a location of the series of locations which leads from the computerized device to the content-originating device includes a set of devices that includes the computerized device and a content fetching leader device, wherein the selected device-path includes the content fetching leader device, and wherein the controller, in order to acquire the content, is configured to:

send a content request message from the computerized device to the content fetching leader device; and receive, in response to the content request message, the content from the content fetching leader device.

12. The computerized device of claim 10 wherein the content is a live feed, and wherein the controller, in order to derive the device-path, is configured to:

probe each device on the formed ordered list for responses; and construct the device-path based on the responses.

13. The computerized device of claim 10 wherein the content is pre-positioned material, and wherein the controller, in order to derive the device-path, is configured to:

request the content from a first device in the formed ordered list; and re-request the content from another device in the formed ordered list if the computerized device does not receive the content from the first device in the formed ordered list.

14. The computerized device of claim 10 wherein the network interface is configured to connect the computerized device to operate within a content distribution network; wherein the controller, when identifying the location-path having the series of locations, is configured to;

read an entry of a table having multiple entries, the multiple entries of the table including (i) domain fields having values that identify content-originating devices, (ii) server fields having sets of values identifying content servers which are configured to serve content for those content-originating devices, and (iii) tree number fields having values which identify inverted tree structures representing location-paths for distributing content from those content-originating devices through locations of the content distribution network, to enable multiple computerized devices to efficiently store common content distribution information, and pick the location-path having the series of locations based on the read entry;

wherein the read entry includes a domain field having a value identifying the content-originating device among other content-originating devices, a server field having a set of values that identifies content servers which are configured to serve content for the content-originating device, and a tree number field having a value which identifies a tree structure representing location-paths for distributing the content from the content-originating device through locations of the content distribution network; and wherein the selected device-path includes exactly one device from each location along the identified location-path.

15. The computerized device of claim 14 wherein the read entry has, as the set of values that identifies the content servers which are configured to serve content for the content-originating device, an ordered series of values; and wherein a first value in the ordered series of values identifies a first content server having priority to serve the content, followed by a second value in the ordered series of values identifying a second content server for serving the content when the first content server fails.

16. A computerized device for obtaining content from a content-originating device, comprising:

a network interface; and a controller coupled to the network interface, the controller being configured to:
  (i) identify a location-path having a series of locations which leads from the computerized device to the content-originating device, wherein each location includes a set of devices, and wherein the set of devices of at least one location includes multiple devices,
  (ii) select a device-path from the computerized device to the content-originating device based on the identified location-path, wherein the selected device-path includes at least one device of each location of the series of locations, and
  (iii) acquire the content from the content-originating device from at least one of the devices along the selected device-path through the network interface;

wherein the content-originating device is configured to operate as a content server for a first host domain; wherein a tree data structure, which defines a content distribution layout having an inverted-tree shape, is associated with a second host domain for distribution of content from the second host domain; and wherein the controller, in order to identify the location-path, is configured to:

associate the tree data structure, which defines the content distribution layout having the inverted-tree shape, with the first host domain; and ascertain the location-path having the series of locations which leads from the computerized device to the content-originating device based on the tree data structure.

17. The computerized device of claim 16 wherein the set of devices of each location along the series of locations which leads from the computerized device to the content-originating device provides multiple possible device-paths from the computerized device to the content-originating device, and wherein the controller, in order to select the device-path, is configured to:

choose a device of each location to construct, as the device-path, a particular one of the multiple possible device-paths from the computerized device to the content-originating device.

18. A computerized device for obtaining content from a content-originating device, comprising:

a network interface; and a controller coupled to the network interface, the controller being configured to:

(i) identify a location-path having a series of locations which leads from the computerized device to the content-originating device, wherein each location includes a set of devices, and wherein the set of devices of at least one location includes multiple devices, (ii) select a device-path from the computerized device to the content-originating device based on the identified location-path, wherein the selected device-path includes at least one device of each location of the series of locations, and (iii) acquire the content from the content-originating device from at least one of the devices along the selected device-path through the network interface;

wherein a location of the series of locations which leads from the computerized device to the content-originating device includes a set of devices that includes the computerized device and a tree former leader device, and wherein the controller, in order to identify the location-path, is configured to:

send a location-path request message from the computerized device to the tree former leader device; and receive, from the tree former leader device, a reply message which defines the location-path having the series of locations which leads from the computerized device to the content-originating device.

19. A set of computerized devices for obtaining content from a content-originating device, comprising:

a first computerized device which is configured as a tree forming leader;

a second computerized device which is coupled to the first computerized device, the second computerized device being configured to:

(i) obtain, from the first computerized device which is configured as a tree forming leader, a communications signal that identifies a location-path having a series of locations which leads from the second computerized device to the content-originating device, wherein each location includes a set of devices, and wherein the set of devices of at least one location includes multiple devices, (ii) select a device-path from the second computerized device to the content-originating device based on the identified location-path, wherein the selected device-path includes at least one device of each location of the series of locations, and (iii) acquire the content from the content-originating device from at least one of the devices along the selected device-path.

20. The set of computerized devices of claim 19, further comprising:

a third computerized device coupled to the second computerized device; wherein the third computerized device is configured as a content fetching leader; and wherein the second computerized device, in order to acquire the content from the content-originating device, is configured to obtain the content through the third computerized device which is configured as the content fetching leader.

21. The set of computerized devices of claim 19 wherein the set of computerized devices reside within a content distribution network; wherein the second computerized device, when obtaining the communications signal identifying the location-path having the series of locations, is configured to:

obtain an entry of a table having multiple entries, the multiple entries of the table including (i) domain fields having values that identify content-originating devices, (ii) server fields having sets of values identifying content servers which are configured to serve content for those content-originating devices, and (iii) tree number fields having values which identify inverted tree structures representing location-paths for distributing content from those content-originating devices through locations of the content distribution network, to enable multiple computerized devices to efficiently store common content distribution information, and pick the location-path having the series of locations based on the read entry;

wherein the obtained entry includes a domain field having a value identifying the content-originating device among other content-originating devices, a server field having a set of values that identifies content servers which are configured to serve content for the content-originating device, and a tree number field having a value which identifies a tree structure representing location-paths for distributing the content from the content-originating device through locations of the content distribution network; and wherein the selected device-path includes exactly one device from each location along the identified location-path.

22. A set of computerized devices for obtaining content from a content-originating device, comprising:

a first computerized device which is configured as a content fetching leader;

a second computerized device which is coupled to the first computerized device, the second computerized device being configured to:

(i) identify a location-path having a series of locations which leads from the second computerized device to the content-originating device, wherein each location includes a set of devices, and wherein the set of devices of at least one location includes multiple devices, (ii) select a device-path from the second computerized device to the content-originating device based on the identified location-path, wherein the selected device-path includes at least one device of each location of the series of locations, and (iii) acquire the content from the content-originating device through the first computerized device which is configured as the content fetching leader;

wherein the set of computerized devices reside within a content distribution network; wherein the second computerized device, when identifying the location-path having the series of locations, is configured to:

read an entry of a table having multiple entries, the multiple entries of the table including (i) domain fields having values that identify content-originating devices, (ii) server fields having sets of values identifying content servers which are configured to serve content for those content-originating devices, and (iii) tree number fields having values which identify inverted tree structures representing location-paths for distributing content from those content-originating devices through locations of the content distribution network, to enable multiple computerized devices to efficiently store common content distribution information, and pick the location-path having the series of locations based on the read entry;

wherein the read entry includes a domain field having a value identifying the content-originating device among other content-originating devices, a server field having a set of values that identifies content servers which are configured to serve content for the content-originating device, and a tree number field having a value which identifies a tree structure representing location-paths for distributing the content from the content-originating device through locations of the content distribution network; and wherein the selected device-path includes exactly one device from each location along the identified location-path.

23. A computerized device for obtaining content from a content-originating device, comprising:

a network interface; and a controller coupled to the network interface, the controller including:

(i) means for identifying a location-path having a series of locations which leads from the computerized device to the content-originating device, wherein each location includes a set of devices, and wherein the set of devices of at least one location includes multiple devices, (ii) means for selecting a device-path from the computerized device to the content-originating device based on the identified location-path, wherein the selected device-path includes at least one device of each location of the series of locations, and (iii) means for acquiring the content from the content-originating device from at least one of the devices along the selected device-path through the network interface;

wherein the network interface is configured to connect the computerized device to operate within a content distribution network; wherein the means for identifying includes:

means for reading an entry of a table having multiple entries, the multiple entries of the table including (i) domain fields having values that identify content-originating devices, (ii) server fields having sets of values identifying content servers which are configured to serve content for those content-originating devices, and (iii) tree number fields having values which identify inverted tree structures representing location-paths for distributing content from those content-originating devices through locations of the content distribution network, to enable multiple computerized devices to efficiently store common content distribution information, and means for picking the location-path having the series of locations based on the read entry;

wherein the read entry includes a domain field having a value identifying the content-originating device among other content-originating devices, a server field having a set of values that identifies content servers which are configured to serve content for the content-originating device, and a tree number field having a value which identifies a tree structure representing location-paths for distributing the content from the content-originating device through locations of the content distribution network; and wherein the selected device-path includes exactly one device from each location along the identified location-path.

24. A computer program product that includes a computer readable medium having instructions stored thereon for directing a computerized to obtain content from a content-originating device, such that the instructions, when carried out by the computerized device, cause the computerized device to perform the steps of:

identifying a location-path having a series of locations which leads from the computerized device to the content-originating device, wherein each location includes a set of devices, and wherein the set of devices of at least one location includes multiple devices;

selecting a device-path from the computerized device to the content-originating device based on the identified location-path, wherein the selected device-path includes at least one device of each location of the series of locations; and acquiring the content from the content-originating device from at least one of the devices along the selected device-path;

wherein computerized device, when identifying the location path, is configured by the instructions to:

read an entry of a table having multiple entries, the multiple entries of the table including (i) domain fields having values that identify content-originating devices, (ii) server fields having sets of values identifying content servers which are configured to serve content for those content-originating devices, and (iii) tree number fields having values which identify inverted tree structures representing location-paths for distributing content from those content-originating devices through locations of the content distribution network, to enable multiple computerized devices to efficiently store common content distribution information, and pick the location-path having the series of locations based on the read entry;

wherein the read entry includes a domain field having a value identifying the content-originating device among other content-originating devices, a server field having a set of values that identifies content servers which are configured to serve content for the content-originating device, and a tree number field having a value which identifies a tree structure representing location-paths for distributing the content from the content-originating device through locations of the content distribution network; and wherein the selected device-path includes exactly one device from each location along the identified location-path.

* * * * *